US012716533B2

(12) United States Patent
Catalano et al.

(10) Patent No.: US 12,716,533 B2
(45) Date of Patent: Aug. 25, 2026

(54) PRESS FITTING

(71) Applicant: RELIANCE WORLDWIDE CORPORATION, Atlanta, GA (US)

(72) Inventors: Joseph Derres Catalano, Roswell, GA (US); Sai Kishore Ravisankar, Alpharetta, GA (US)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

(21) Appl. No.: 19/107,861

(22) PCT Filed: Oct. 6, 2023

(86) PCT No.: PCT/US2023/034637

§ 371 (c)(1),
(2) Date: Feb. 28, 2025

(87) PCT Pub. No.: WO2024/076732

PCT Pub. Date: Apr. 11, 2024

(65) Prior Publication Data

US 2025/0383039 A1 Dec. 18, 2025

Related U.S. Application Data

(60) Provisional application No. 63/519,609, filed on Aug. 15, 2023, provisional application No. 63/378,637, filed on Oct. 6, 2022.

(51) Int. Cl.
*F16L 37/02* (2006.01)

(52) U.S. Cl.
CPC .................................. *F16L 37/025* (2013.01)

(58) Field of Classification Search
None
See application file for complete search history.

(56) References Cited

U.S. PATENT DOCUMENTS

| | | | | |
|---|---|---|---|---|
| D427,668 | S | 7/2000 | Stout, Jr. | |
| D439,637 | S | 3/2001 | Davies | |
| 6,439,617 | B1 * | 8/2002 | Boer | F16L 33/2075 285/244 |
| D571,440 | S | 6/2008 | Kanao | |
| D589,126 | S | 3/2009 | Concannon | |
| D612,020 | S | 3/2010 | Ward | |
| D691,246 | S | 10/2013 | Ward | |
| D715,145 | S | 10/2014 | Yamagishi et al. | |
| D908,846 | S | 1/2021 | Kluss et al. | |

(Continued)

FOREIGN PATENT DOCUMENTS

| | | | |
|---|---|---|---|
| EP | 1470356 | B1 | 5/2006 |
| EP | 2044359 | B1 | 12/2009 |
| WO | 03012328 | A1 | 2/2003 |

OTHER PUBLICATIONS

International Search Report & Written Opinion in PCT/US2023/034637, mailed Feb. 6, 2024.

*Primary Examiner* — Aaron M Dunwoody
(74) *Attorney, Agent, or Firm* — Barnes & Thornburg LLP

(57) ABSTRACT

The present application relates to press fittings. The press fittings may include a connector body and a press sleeve. The connector body includes a connection segment and a retainer segment. The connection segment is configured to receive a conduit. The press sleeve may be crimped on the conduit and the connection segment.

20 Claims, 32 Drawing Sheets

(56) References Cited

U.S. PATENT DOCUMENTS

| | | | |
|---|---|---|---|
| D994,091 | S | 8/2023 | Arment et al. |
| D1,009,227 | S | 12/2023 | Arment et al. |
| D1,013,126 | S | 1/2024 | Hendricks |
| D1,032,833 | S | 6/2024 | Chen |
| D1,069,047 | S | 4/2025 | Ledford et al. |
| D1,072,244 | S | 4/2025 | Buck |
| 2009/0026764 | A1 | 1/2009 | Beckmann et al. |
| 2018/0051834 | A1 | 2/2018 | Hoffman |

* cited by examiner

PRESS FITTING

PRIORITY CLAIM

This Application claims priority to U.S. Patent Application No. 63/378,637, filed Oct. 6, 2022, and U.S. Patent Application No. 63/519,609, filed Aug. 15, 2023.

INCORPORATION BY REFERENCE

The disclosure and figures of U.S. Patent Application No. 63/378,637, filed Oct. 6, 2022, and U.S. Patent Application No. 63/519,609, filed Aug. 15, 2023, are incorporated by reference herein as if set forth in their entirety.

TECHNICAL FIELD

The present disclosure relates generally to pipe connections. More specifically, the present disclosure relates to press fittings used to connect sections of pipe.

SUMMARY

The present application relates to press or crimp fittings for joining conduits, such as tubes or pipes for fluids. The press fitting includes a connector body that has a first end, an opposite, second end and a passage or bore that extends through the first and second ends along a longitudinal length thereof, placing the first and second ends in fluid communication. The passage of the connector body includes a tapered lead-in to allow for ease of fluid flow therethrough.

The connector body may include a single piece or unitary body made of a plastic or other polymeric suitable materials, such as polyphenylsulfone (PPSU), although alternatives are possible. In other examples, the connector body may be made from polysulfone (PSU) or polyphenylene sulfide (PPS) or other similar polymeric material. In other examples, the connector body may be made of a forged or cast metallic material, such as, brass, stainless steel, bronze, copper alloys, steel alloys, etc., without departing from the scope of the present disclosure.

The connector body includes a first connection segment at a first end of the connector body and a second connection segment at a second end of the connector body. The first and second connection segments may be cylindrical portions that extend in a general longitudinal direction. The first and second connection segments are sized and adapted for reception within passages of respective first and second conduits (e.g., pipes, tubes) to form an inner diameter ID seal with the first and second conduits. In certain examples, the connection segments can include nipple portions configured to be received within the conduits.

The first and second connection segments define inner surfaces (e.g., interior surfaces) and outer surfaces (e.g., exterior surfaces). The outer surfaces of the first and second connection segments may have surface portions dimensioned to engage inner walls of the first and second conduits to facilitate gripping or other engagement therewith. The surface portions may include barbed portions on the outer surface of the connection segments to assist in coupling the connector body to the respective first and second conduits. The configuration of the barbed portions may be dictated by ASTM F3347 or F3348 or other suitable codes or standards.

The connector body may further include a circumferential rib that extends from the connector body between the first and second connection segments. The circumferential rib is integrally formed as one piece or unitary with the connector body. The circumferential rib can be located in a middle or center part of the connector body between the first and second connection segments.

The circumferential rib may include a stem portion and a crossbar portion that forms a T-shaped locator rib extending along opposing sides of the connector body, although alternatives are possible. In examples, a plurality of locator ribs may be positioned on the connector body at opposite sides thereof, although alternatives are possible. The crossbar portion may extend longitudinally parallel to the connector body and extend perpendicularly to the stem portion. The crossbar portion of the locator rib has or carries a contact or engagement component that serves as an alignment feature for a pressing or crimping tool.

The connector body may also include circumferential walls or portions (e.g., protrusions) that extend outwardly from the outer surface thereof on opposite sides of the locator rib. The circumferential walls each include an inclined surface. The circumferential walls may be integrally formed as one piece or unitary with the connector body. The stem portion of the locator rib and the walls of the connector body together define channels on opposite sides of the locator rib. The crossbar portion may extend over the channels and over the walls of the connector body.

The press fitting further includes press sleeves (i.e., press portions or elements) that are attached to the connector body. A first press sleeve is received over the first connection segment and a second press sleeve is received over the second connection segment. The first and second press sleeves are pre-installed onto the connector body for ease of installation. The first and second press sleeves may be formed from a metallic material, such as, stainless steel, copper, aluminum, or other suitable metallic material. The first and second press sleeves and the connector body together define respective first and second passages for receiving the first and second conduits. The first and second press sleeves are deformable and configured to be engaged and thereby deformed by a press or crimp tool to connect conduits to the press fitting.

The first and second press sleeves each include a distal end and an opposite proximal end. The distal ends of the first and second press sleeves include a flange and the proximal ends of the first and second press sleeves include a lip. The flange at the distal ends of the first and second press sleeves include a tapered lead-in and the lip at the proximal ends of the first and second press sleeves include a curved edge.

During assembly of the first and second press sleeves to the connector body, the first and second press sleeves are moved along a longitudinal axis relative to the connector body such that the curved edges of the lips of the first and second press sleeves engage the inclined surfaces of the circumferential walls. The inclined surfaces of the circumferential walls assist in guiding the first and second press sleeves over the circumferential walls and into the channels of the connector body for attachment to the connector body (e.g., the lips of the press sleeves are received or otherwise positioned within the channels for connection of the press sleeves to the connector body).

When the first and second press sleeves are connected to the connector body, the first and second press sleeves and the respective first and second connection segments together define passageways for receipt of the first and second conduits, respectively.

The contact component of the crossbar portion of the locator rib is configured to engage an outer surface of the first and second press sleeves to facilitate a substantially secure connection with the connector body. The crossbar portion is also configured to facilitate location of a pressing tool in relation to the first and second press sleeves. The crossbar portion helps to ensure that the pressing tool is properly aligned to provide sufficient engagement of the plurality of ribs with the conduits.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

The present application is directed to press or crimp fittings for joining conduits (e.g., PEX tubings, such as PEX a, PEX b, PEX c, PERT, and the like). These fittings are configured to provide a seal with end portions of conduits to create a substantially watertight connection. These press fittings may be used with fluid conduits of varying diameters, including fluid conduits having a diameter less than 0.25 inches to fluid conduits having a diameter of greater than 2 inches or more. The press fittings are manufactured to ASTM F3347 or F3348 standard. Reference is hereby made to U.S. Provisional Patent Application No.

Figure 1:
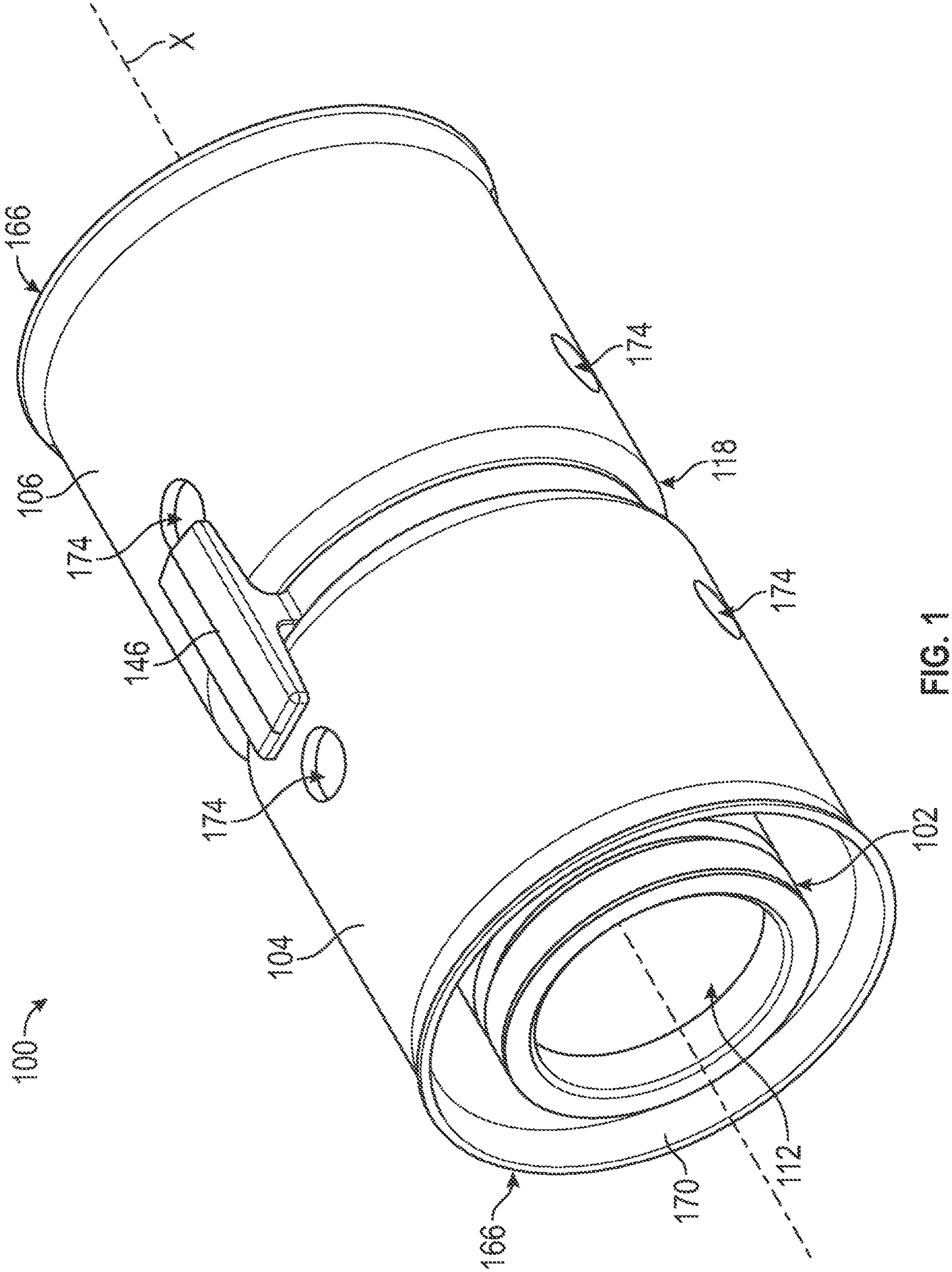
FIG. 1 illustrates a perspective view of an example press fitting including a connector body and press sleeves in accordance with principles of the present disclosure.
Figure 2:
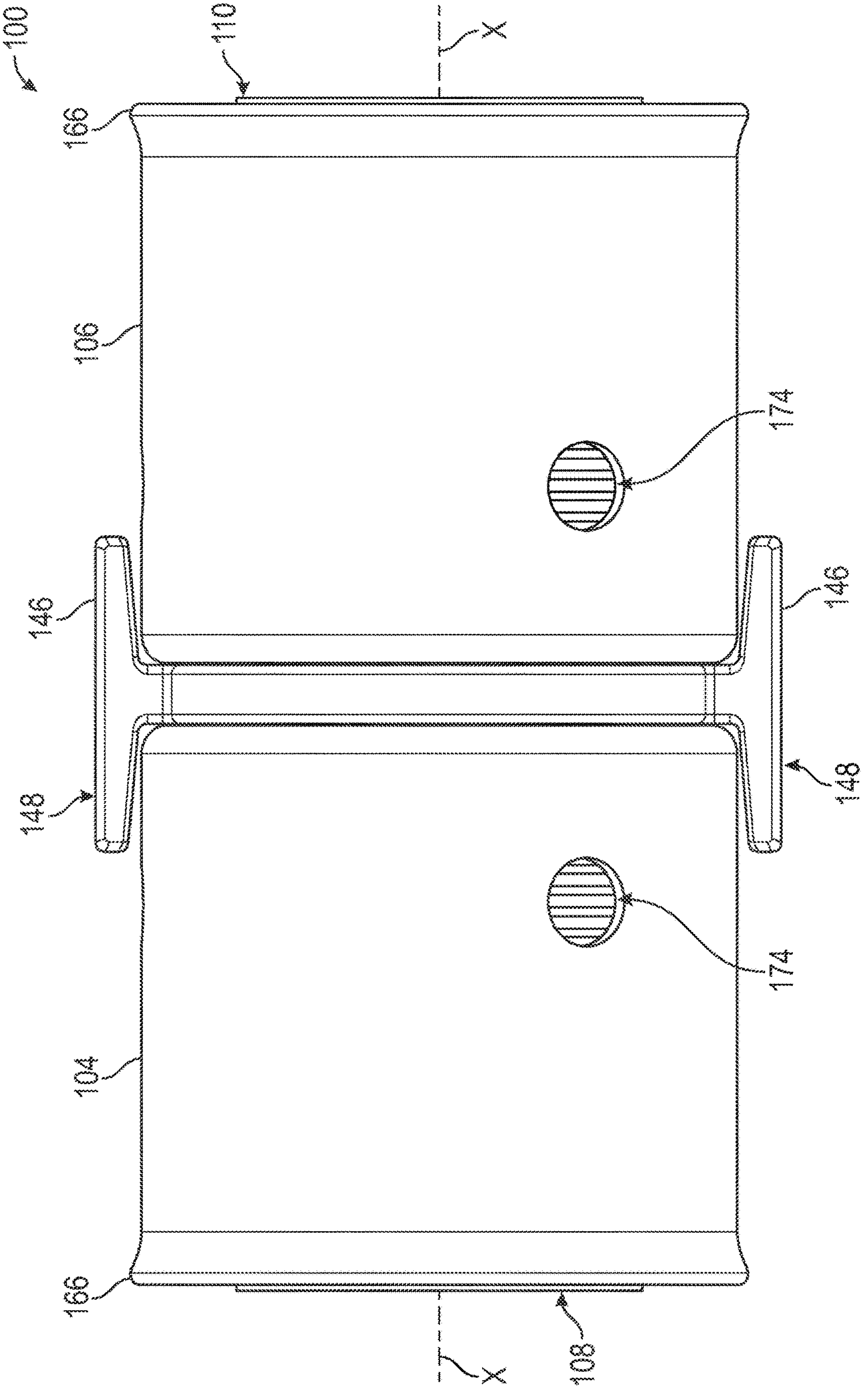
FIG. 2 illustrates a side view of the press fitting of FIG. 1.
Figure 3:
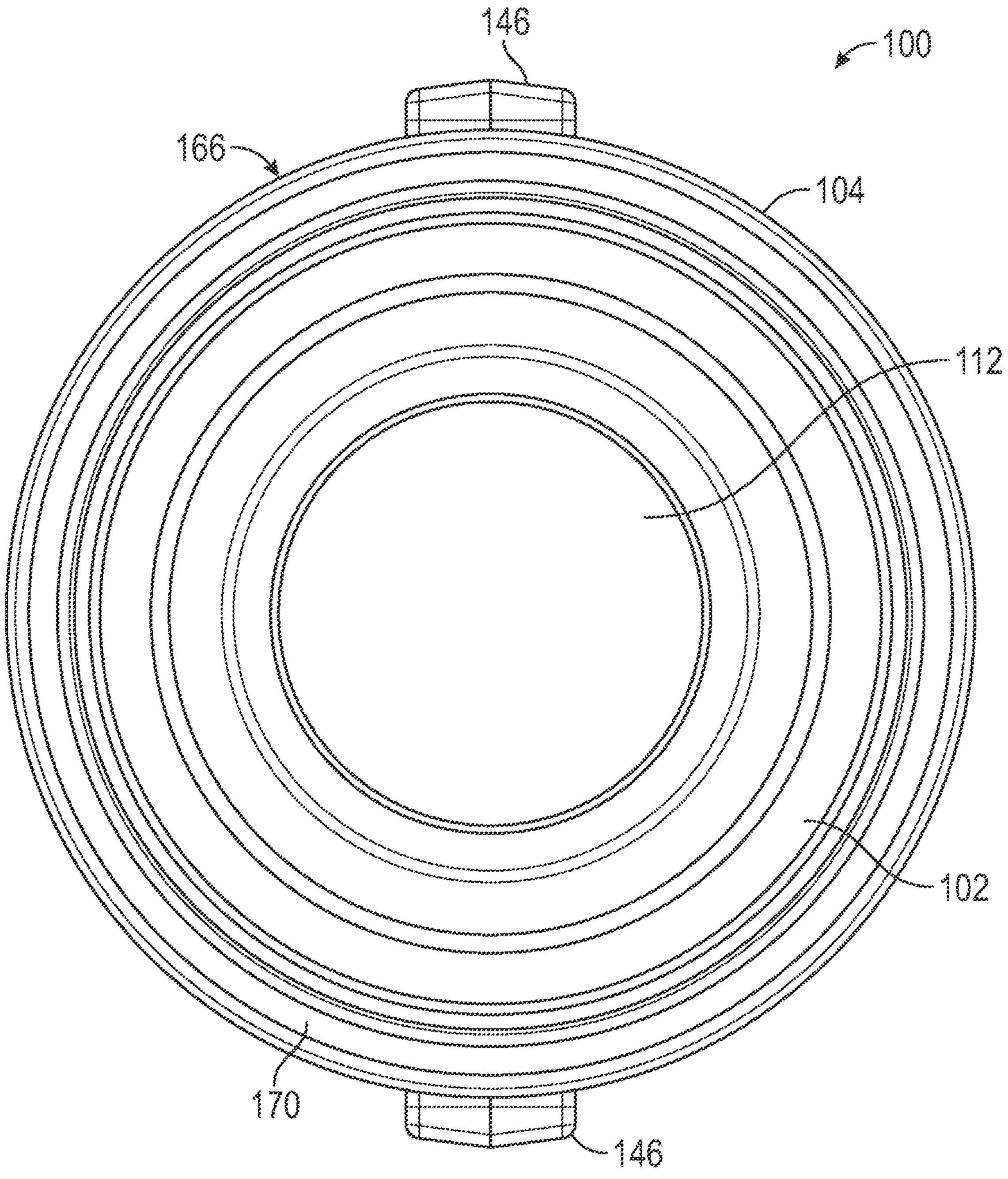
FIG. 3 illustrates an end view of the press fitting of FIG. 1.

FIGS. 1-3 illustrate an example press fitting 100 in accordance with the principles of the present disclosure. The press fitting 100 includes a connector body 102, a first press sleeve 104, and a second press sleeve 106.

The press fitting 100 may be made in a variety of configurations and sizes that are designed to handle various fluid applications. For example, the press fitting 100 may include a straight-line connector body or coupler, an elbow connector body or coupler, a t-shaped connector body or coupler, a blind-end connector body that blocks flow, a connector body configured to receive different diameter fluid conduits, an angle connector body, a multi-line (or 4-way) connector body, a wye (Y) connector body, a tee-wye connector body, another type of connector body or combinations of connector bodies.

The connector body 102 of the press fitting 100 includes a single piece/unitary body made of a plastic or other polymeric material suitable for the intended application, such as polyphenylsulfone (PPSU), although alternatives are possible. In other examples, the connector body 102 may be made from polysulfone (PSU) or polyphenylene sulfide (PPS) or other similar polymeric material. In certain examples, the connector body 102 may be made of a forged or cast metallic material, such as, brass, stainless steel, bronze, copper alloys, steel alloys, etc., without departing from the scope of the present disclosure.

The connector body 102 has a first end 108, an opposite, second end 110 and a passage 112 (e.g., bore) that extends through the first and second ends 108, 110 along a longitudinal axis X thereof, placing the first and second ends 108, 110 in fluid communication.

Figure 4:
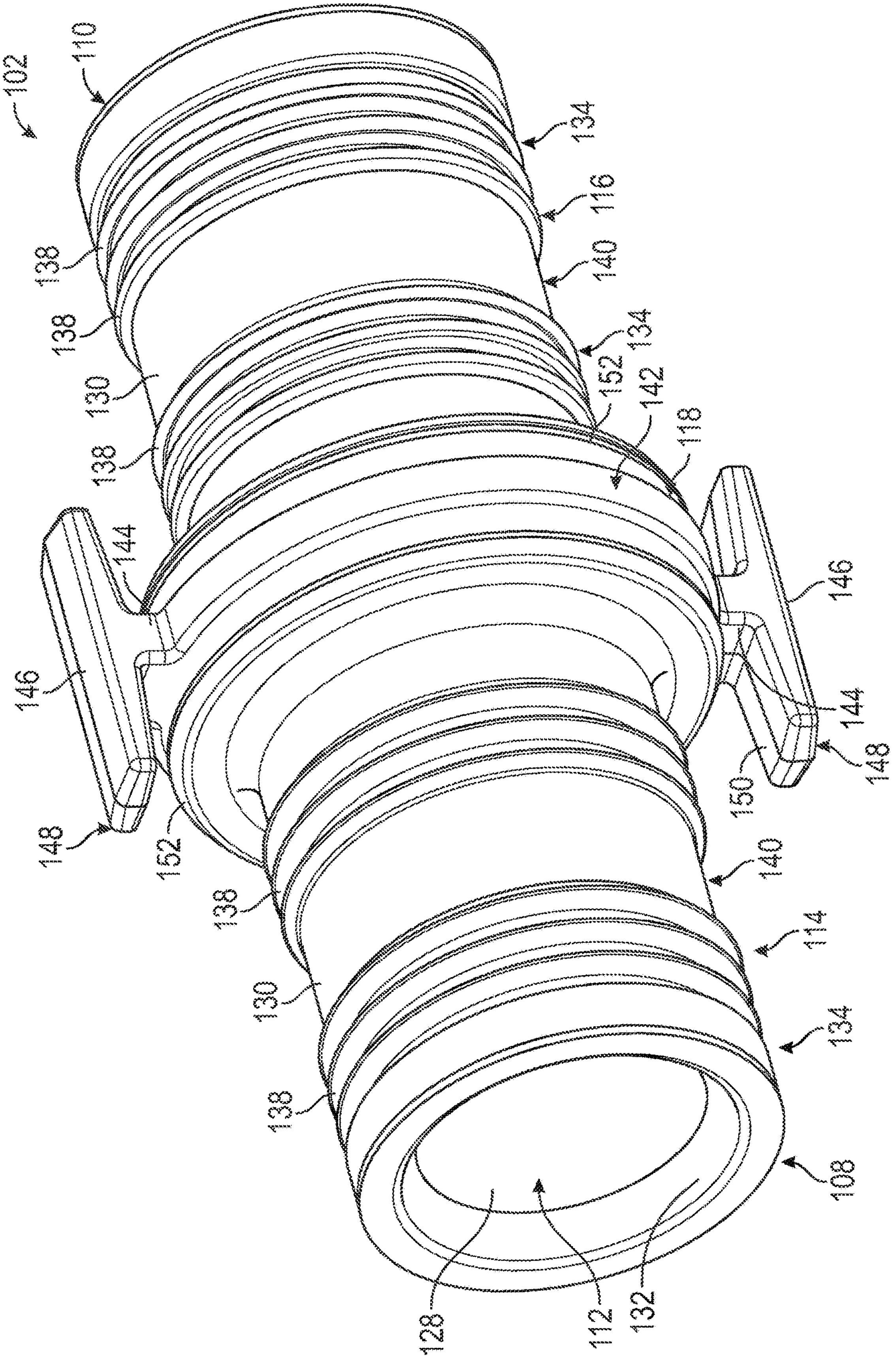
FIG. 4 illustrates a perspective view of the connector body in accordance with the principles of the present disclosure.
Figure 5:
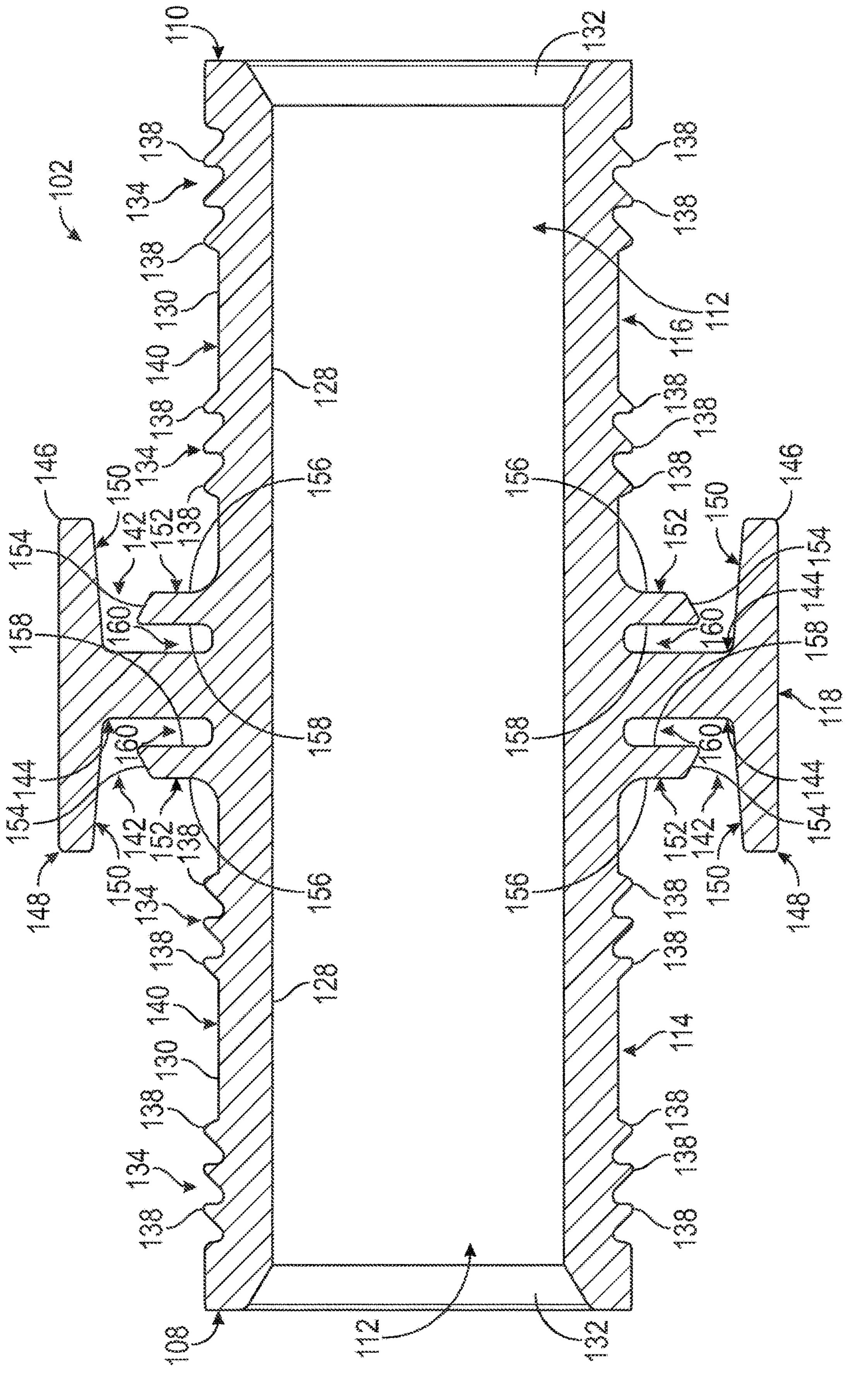
FIG. 5 illustrates a cross-sectional view of the connector body of FIG. 4.
Figure 8:
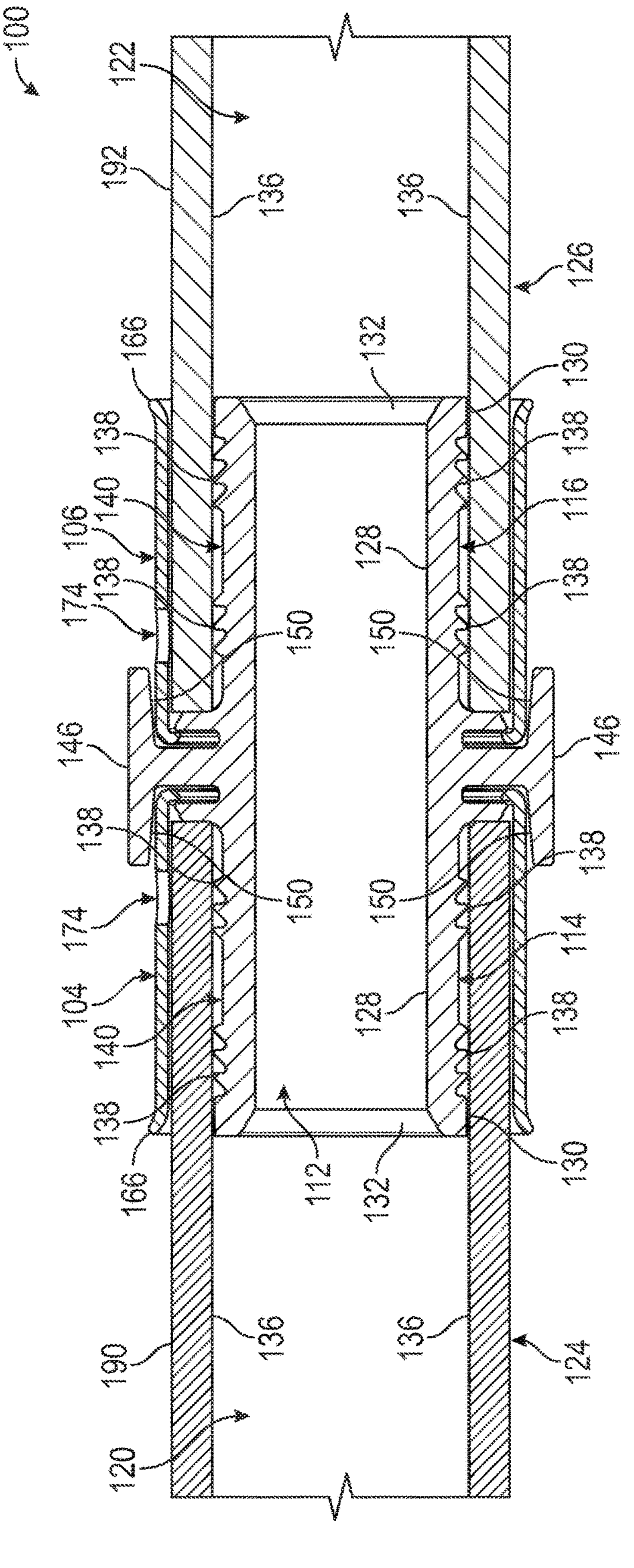
FIG. 8 illustrates a cross-sectional view of the press fitting of FIG. 7 including fluid conduits in accordance with principles of the present disclosure.

Turing to FIGS. 4-5, the connector body 102 may include a first connection segment 114 at the first end 108 of the connector body 102 and a second connection segment 116 at the second end 110 of the connector body 102. The first and second connection segments 114, 116 may be cylindrical portions that extend along the longitudinal axis X in opposing directions relative to a center portion 118 or middle part of the connector body 102. The first and second connection segments 114, 116 are sized and configured for reception within passages 120, 122 of respective first and second conduits 124, 126 (e.g., pipes, tubes) (see FIG. 8) to form an inner diameter ID seal with the first and second conduits 124, 126. The first press sleeve 104 is configured to be received over the first connection segment 114 and the second press sleeve 106 is configured to be received over the second connection segment 116. The first and second press sleeves 104, 106 are pre-installed onto the connector body 102 for ease of installation. The first and second press sleeves 104, 106 are deformable and configured to be engaged and thereby deformed by a press or crimp tool to connect conduits to the press fitting 100.

The first and second connection segments 114, 116 define inner surfaces (e.g., interior surfaces) 128 and outer surfaces 130 (e.g., exterior surfaces). In certain examples, the inner surfaces 128 of the first and second connection segments 114, 116 of the connector body 102 include a tapered lead-in 132 (also see FIG. 8) at the first and second ends 108, 110 of the passage 112 to allow for ease of fluid flow therethrough or in some applications for ease of insertion of a liner (not shown).

In certain examples, the first and second connection segments 114, 116 can include nipple portions configured to be received within the respective first and second conduits 124, 126. The outer surfaces 130 of the first and second connection segments 114, 116 may have surface portions 134 dimensioned to engage inner walls 136 of the first and second conduits 124, 126 to facilitate gripping or other engagement therewith. The surface portions 134 may include barbed portions. In certain examples, the barbed portions have a plurality of ribs 138 on the outer surface 130 of the connector body 102 to assist in coupling the connector body to the respective first and second conduits. The configuration of the barbed portions may be dictated by ASTM F3347 or F3348 or other suitable codes or standards. The first and second connection segments 114, 116 each include two surface portions 134 on the outer surfaces 130 that respectively define an annular recessed zone 140 therebetween.

The connector body 102 may further include a circumferential rib 142 that extends from the connector body 102 between the first and second connection segments 114, 116. The circumferential rib 142 is integrally formed as one piece or unitary with the connector body 102. The circumferential rib 142 can be located at the center portion 118 of the connector body 102 between the first and second connection segments 114, 116. The circumferential rib 142 can include a stem portion 144 and a crossbar portion 146 that together form a T-shaped locator rib 148 that extends along opposing sides of the connector body 102, although alternatives are possible. In certain examples, a plurality of locator ribs may be positioned on the connector body 102 at opposite sides thereof, although alternatives are possible. In the example shown, two T-shaped locator ribs 148 are positioned on the connector body 102 at opposite sides thereof. The crossbar portion 146 may extend longitudinally parallel to the connector body 102 and extend perpendicularly to the stem portion 144. The crossbar portion 146 of the locator rib 148 has or carries a contact or engagement component 150 that serves as an alignment feature for a pressing or crimping tool. Although two T-shaped locator ribs 148 are depicted, it will be appreciated that any number of locator ribs may be provided and may be provided in a variety of configurations. In certain examples, the connector body 102 may include four, six, eight, etc. locator ribs.

Still referring to FIG. 5, the connector body 102 may also include circumferential walls or portions 152 (e.g., protrusions, flanges) radially projecting from the outer surface 130 thereof on opposite sides of the stem portions 144 of the T-shaped locator rib 148. The circumferential walls 152 form an inclined surface 154 (e.g., sloped surface). The circumferential walls 152 each include a first engagement surface 156 and an opposite second engagement surface 158. The inclined surface 154 of the circumferential walls 152 inclines in a direction from the first engagement surface 156 toward the second engagement surface 158. The circumferential walls 152 may be integrally formed as one piece or unitary with the connector body 102. The stem portion 144 of the locator rib 148 and the circumferential walls 152 of the connector body 102 together define channels 160 on opposite sides of the locator rib 148. The crossbar portion 146 may extend over the channels 160 and over the circumferential walls 152 of the connector body 102, although alternatives are possible.

Figure 6:
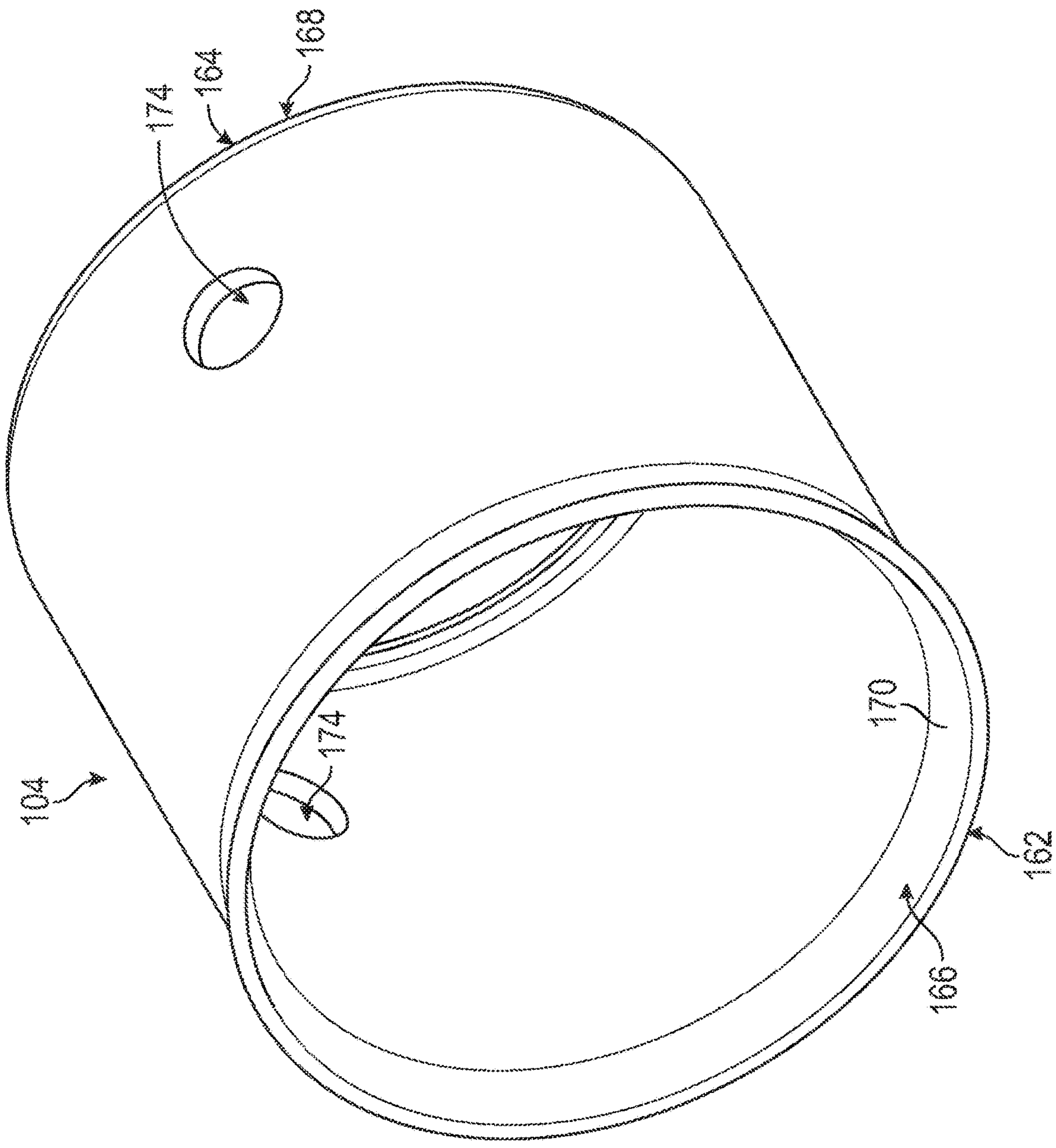
FIG. 6 illustrates a perspective view of the press sleeve of FIG. 1 in accordance with the principles of the present disclosure.

Turning to FIG. 6, the press sleeve 104 is depicted. It will be appreciated that the first and second press sleeves 104, 106 are identical. As such, a detailed description of one will suffice. The first press sleeve 104 may be formed from a metallic material, such as, stainless steel, copper, aluminum, or other suitable metallic material.

The first press sleeve 104 includes a distal end 162 and an opposite proximal end 164. The distal end 162 of the first press sleeve 104 include a flange 166 and the proximal end 164 of the first press sleeve 104 includes a lip 168. The flange 166 at the distal end 162 of the first press sleeve 104 includes a chamfered edge 170 (e.g., a tapered lead-in). The lip 168 at the proximal end 164 of the first press sleeve 104 includes a curved edge 172. The first press sleeve 104 also defines holes 174 for viewing therethrough.

Figure 7:
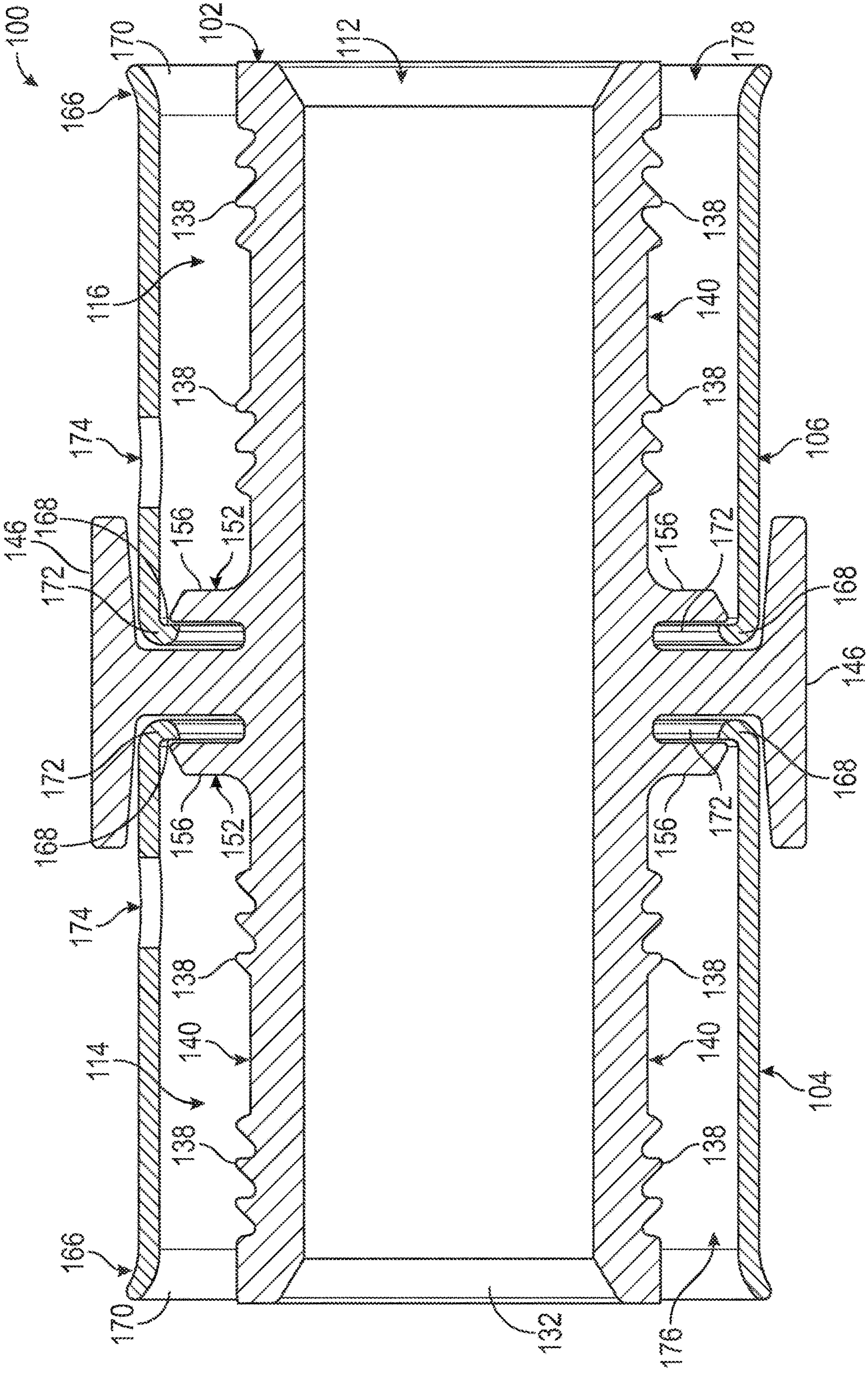
FIG. 7 illustrates a cross-sectional view of the press fitting of FIG. 1.
Figure 9:
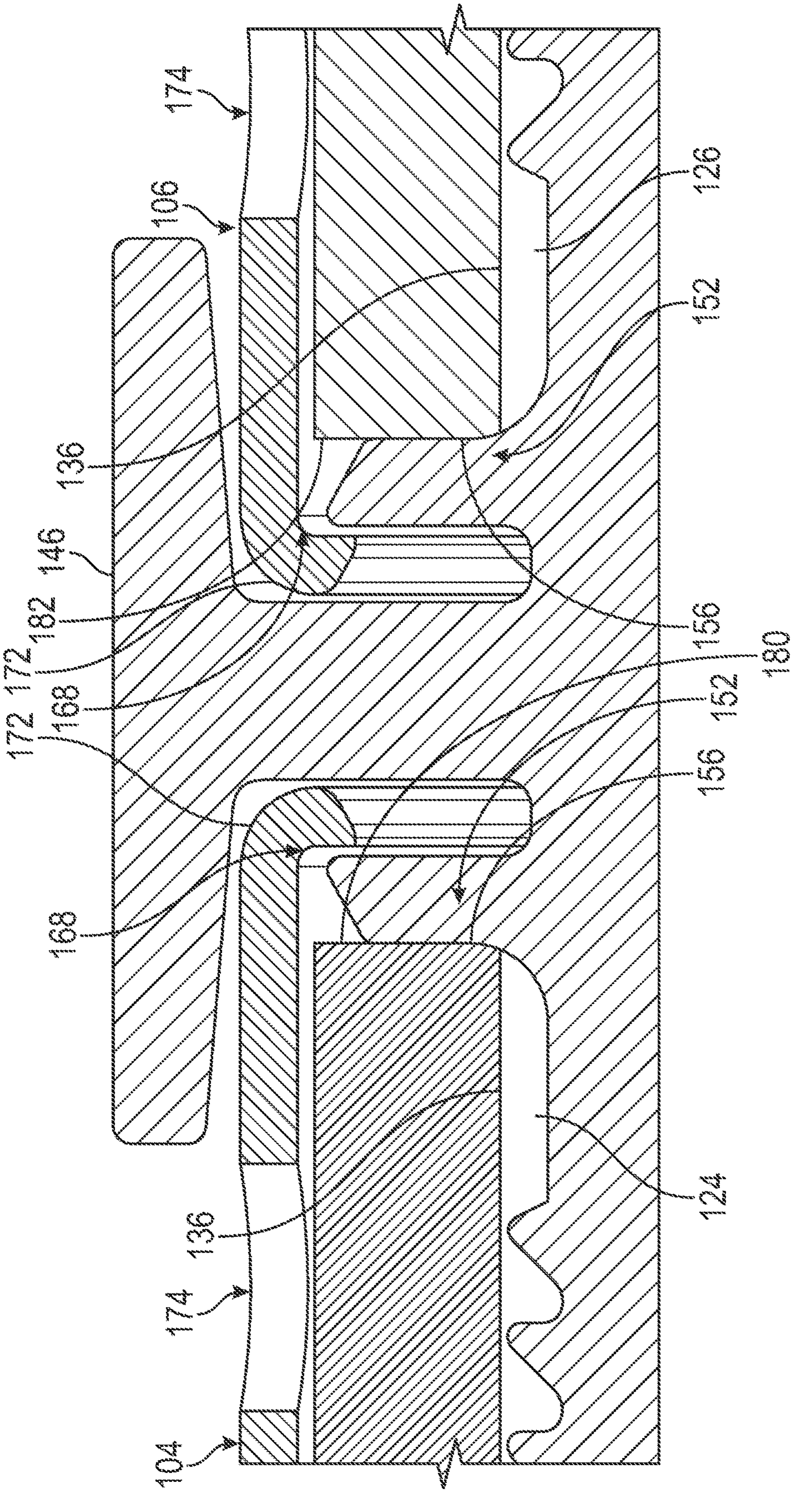
FIG. 9 illustrates an enlarged view of a portion of the press fitting of FIG. 8.

Turning to FIG. 7, the first and second press sleeves 104, 106 are shown connected to the connector body 102. The first and second press sleeves 104, 106 and the connector body 102 together define respective first and second passageways 176, 178 for receiving the first and second conduits 124, 126 (see FIGS. 8-9). When the first and second conduits 124, 126 are fully inserted into the respective first and second passages 176, 178, end faces 180, 182 of the first and second conduits 124, 126 may abut the first engagement surface 156 of the respective circumferential walls 152. The holes 174 of the first and second press sleeves 104, 106 allow an installer to visually see where the conduits is positioned during insertion.

Figure 10:
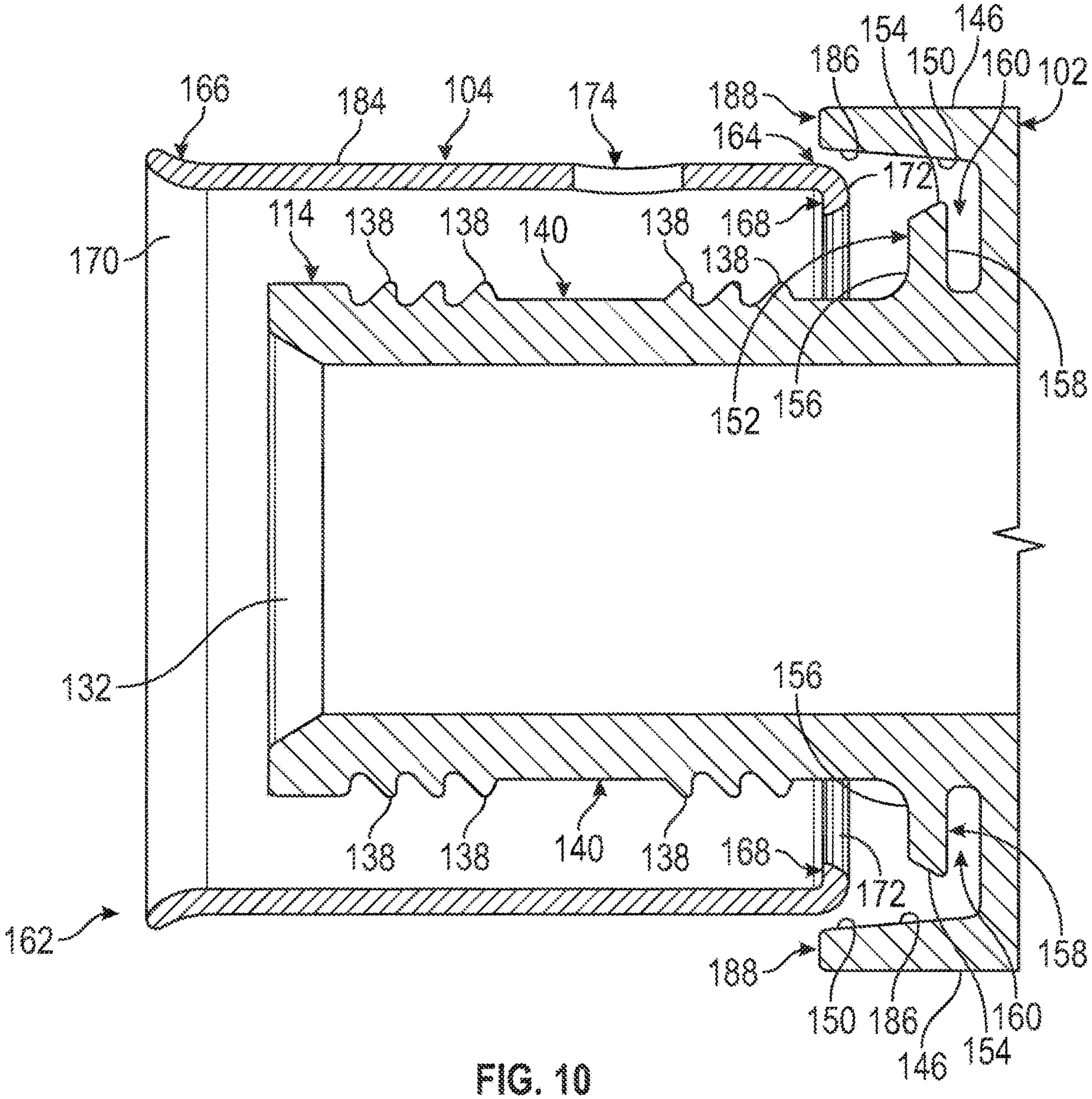
FIG. 10 illustrates an enlarged view of a portion of the press fitting of FIG. 7 showing the press sleeve prior to connection with the connector body in accordance with the principles of the present disclosure.
Figure 11:
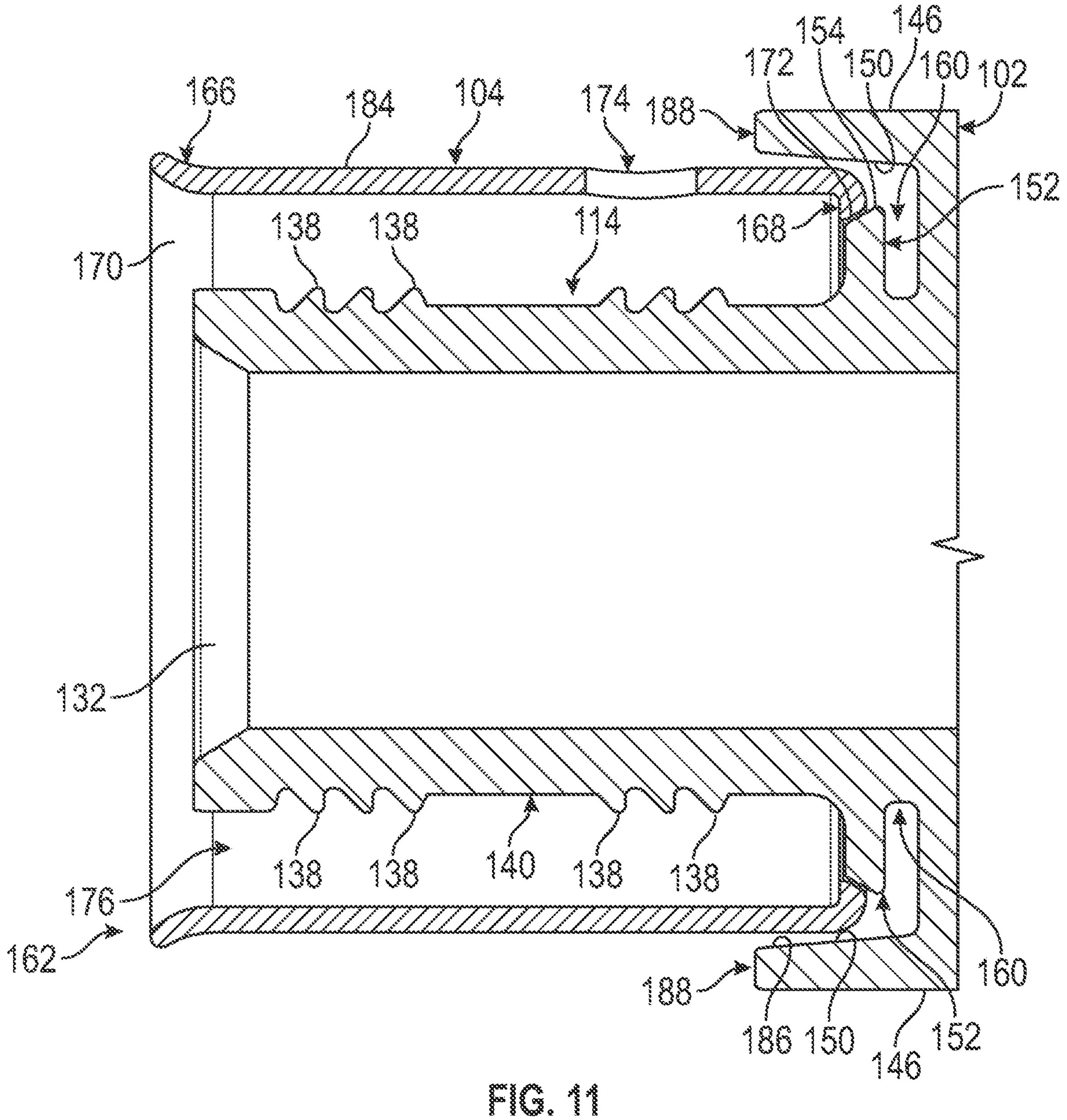
FIG. 11 illustrates an enlarged view of a portion of the press fitting of FIG. 7 showing a lip of the press sleeve engaging a protrusion of the connector body during attachment of the press sleeve to the connector body in accordance with the principles of the present disclosure.
Figure 12:
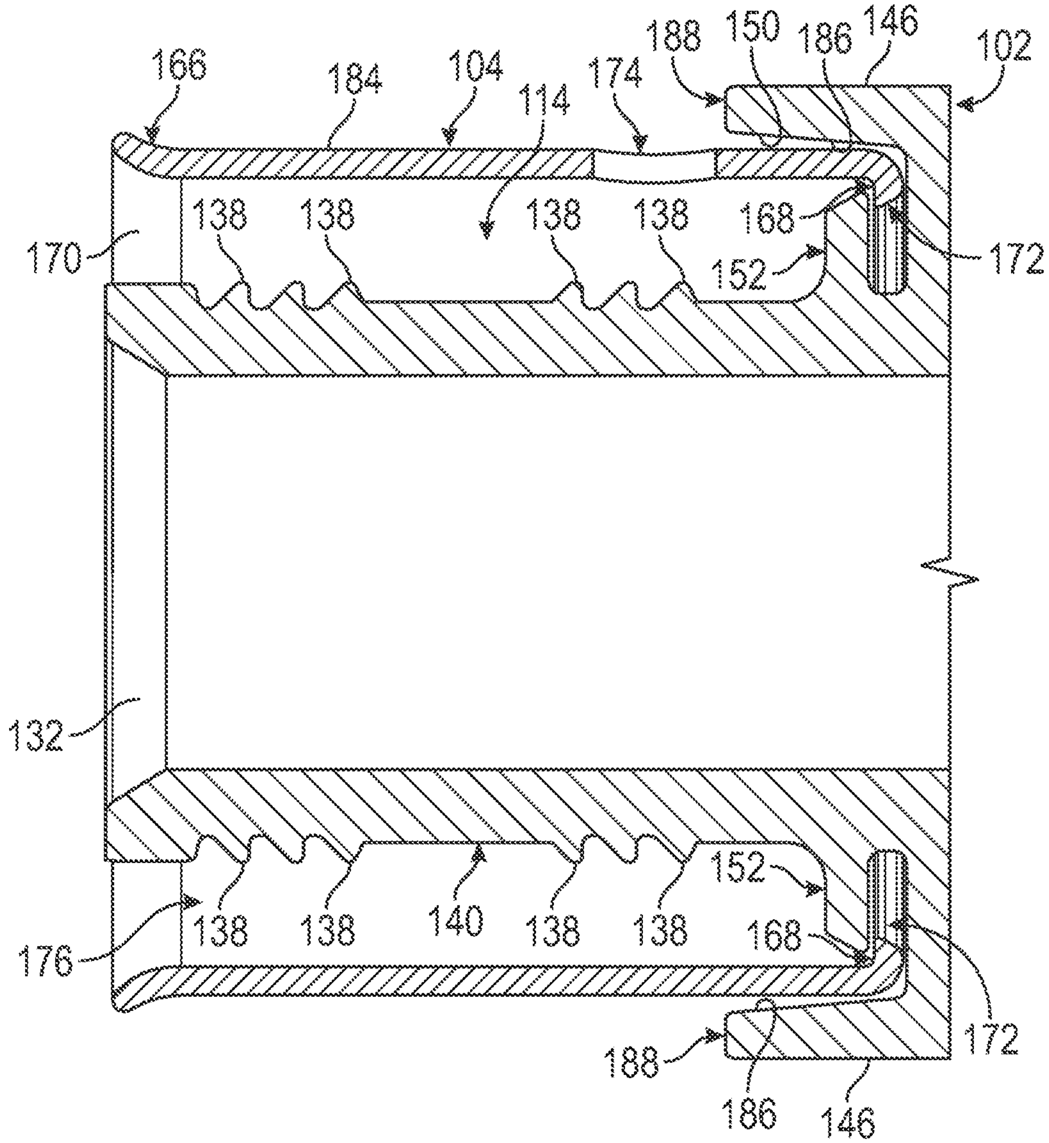
FIG. 12 illustrates an enlarged view of a portion of the press fitting of FIG. 7 showing the lip of press sleeve received in a channel defined by the connector body to form a snap connection of the press sleeve to the connector body in accordance with the principles of the present disclosure.

FIGS. 10-12 show the assembly of the first press sleeve 104 to the connector body 102. The first press sleeve 104 is moved along the longitudinal axis X relative to the connector body 102. The curved edge 172 of the lip 168 of the first press sleeve 104 is configured to engage the inclined surface 154 of the circumferential wall 152. The inclined surface 154 of the circumferential wall 152 assists in guiding the first press sleeve 104 over the circumferential wall 152 during assembly. The lip 168 of the first press sleeve 104 may be guided over the inclined surface 154 of the circumferential wall 152 into the channel 160 of the connector body 102 to form a snap fit connection with the connector body 102. The curved edge 172 of the lip 168 helps to prevent the first press sleeve 104 from being backed out or removed from the channel 160.

When the first and second press sleeves 104, 106 are connected to the connector body 102, the first and second press sleeves 104, 106 and the respective first and second connection segments 114, 116 together define passageways 176, 178 for receipt of the first and second conduits 124, 126 respectively. The chamfered edges 170 of the first and second press sleeves 104, 106 are configured to allow for ease of insertion of the first and second conduits 124, 126 into the passageways 176, 178.

The contact component 150 of the crossbar portion 146 of the locator rib 148 is configured to engage an outer surface 184 of the first and second press sleeves 104, 106 to facilitate a substantially secure connection with the connector body 102. That is, the contact component 150 of the crossbar portion 146 assist in supporting the first and second press sleeves 104, 106 to the connector body 102.

The contact component 150 of the locator ribs 148 may include an inclined inner guide surface 186 to guide the attachment of the first and second press sleeves 104, 106. That is, the inclined inner guide surface 186 provide a guide surface for the first and second press sleeves 104, 106 such that the inclined inner guide surfaces 186 engage the outer surface 184 of the first and second press sleeves 104, 106 to guide the first and second press sleeves 104, 106 as it is received onto the connector body 102. The inclined inner guide surface 186 of the crossbar portion 146 may be configured to face or oppose the circumferential walls 152 of the connector body 102. The inclined inner guide surface 186 may extend over portions of the first and second sleeves 104, 106 when the first and second press sleeves 104, 106 are attached to the connector body 102. The inclined inner guide surface 186 may incline from ends 188 of the crossbar portion 146 toward the stem portion 144, although alternatives are possible.

The crossbar portion 146 is also configured to facilitate location of a pressing tool (not shown) in relation to the first and second press sleeves 104, 106. That is, the crossbar portion 146 helps to ensure that a pressing tool is properly aligned to provide sufficient engagement of the plurality of ribs 138 with the first and second conduits 124, 126. The first and second press sleeves 104, 106 may be crimped such that portions of the first and second press sleeves 104, 106 are deformed and press into or engage outer surfaces 190, 192 of the respective first and second conduits 124, 126. As such, the plurality of ribs 138 are pressed (e.g., engage, dig) into the inner walls 136 of the respective first and second conduits 124, 126.

Figure 13:
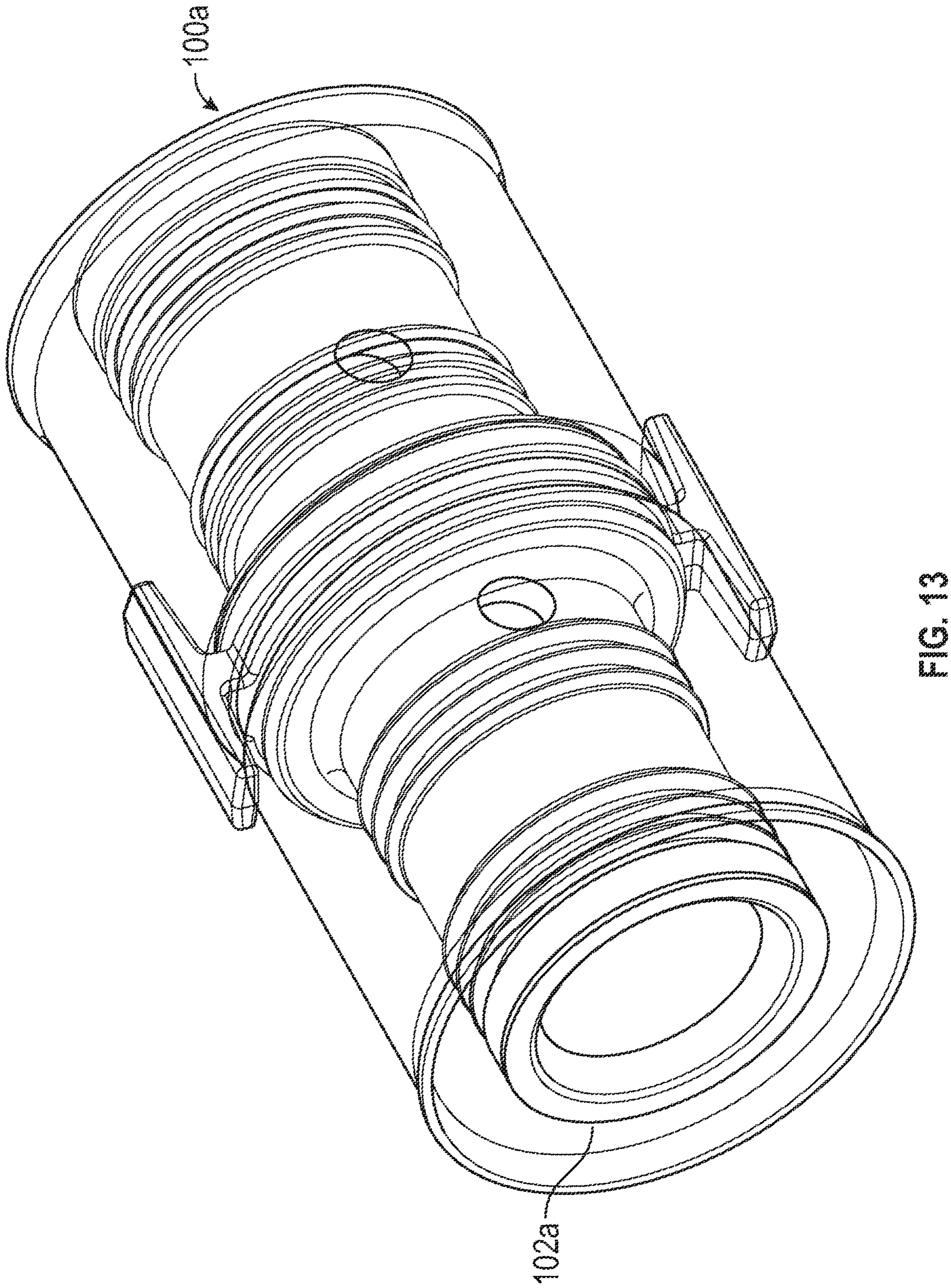
FIG. 13 illustrates another example press fitting with a connector body formed from a clear plastic in accordance with the principles of the present disclosure.

In embodiments, the principles of the present disclosure may relate to another example press fitting 100*a* that can include a connector body 102*a* formed from a clear plastic as generally indicated in FIG. 13.

FIGS. 14-17 illustrate even further example press fittings 100*b*, 100*c* with a connector body in accordance with the principles of the present disclosure.

Figure 14:
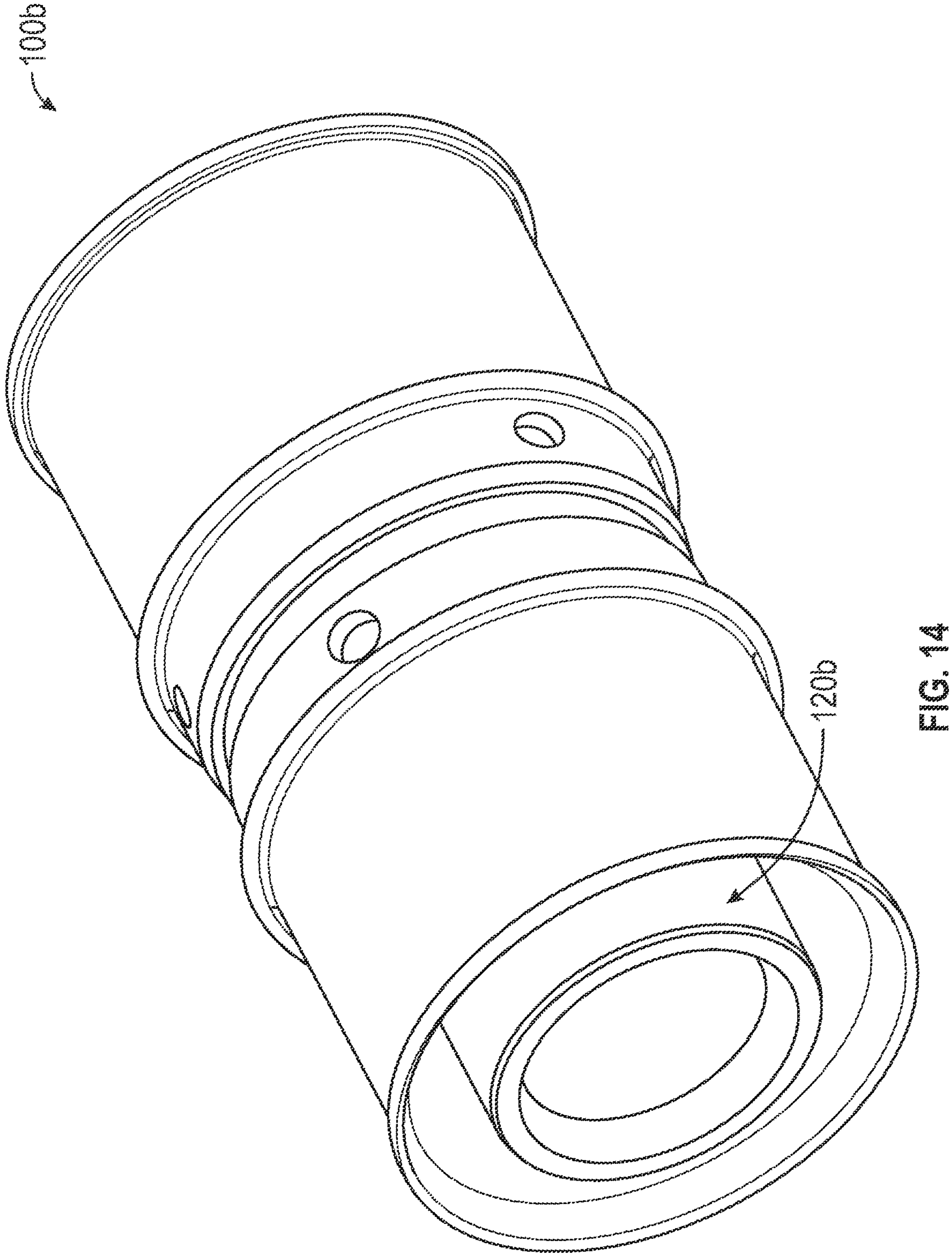
FIGS. 14-17 illustrate even further example press fittings with a connector body in accordance with the principles of the present disclosure.
Figure 15:
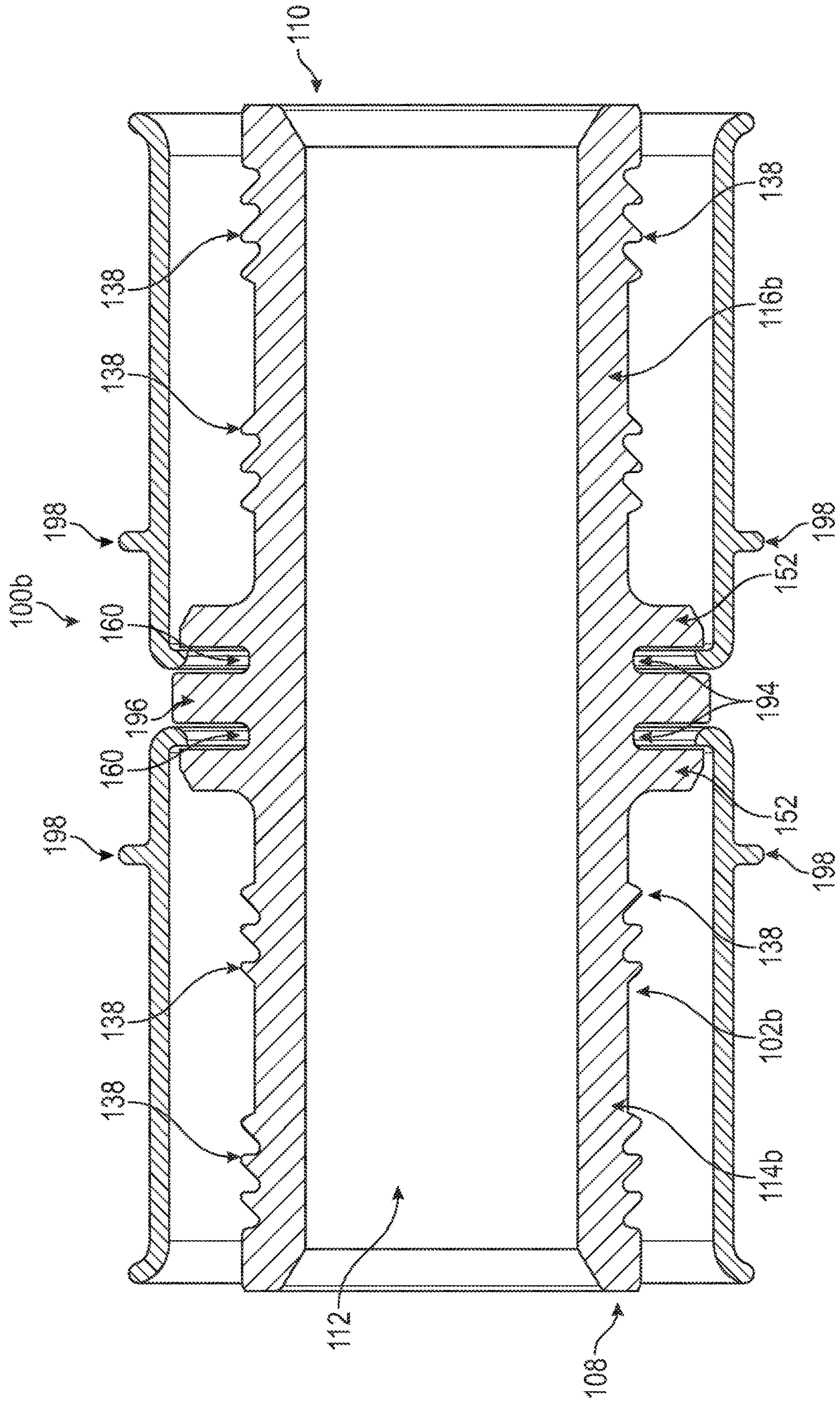
Figure 16:
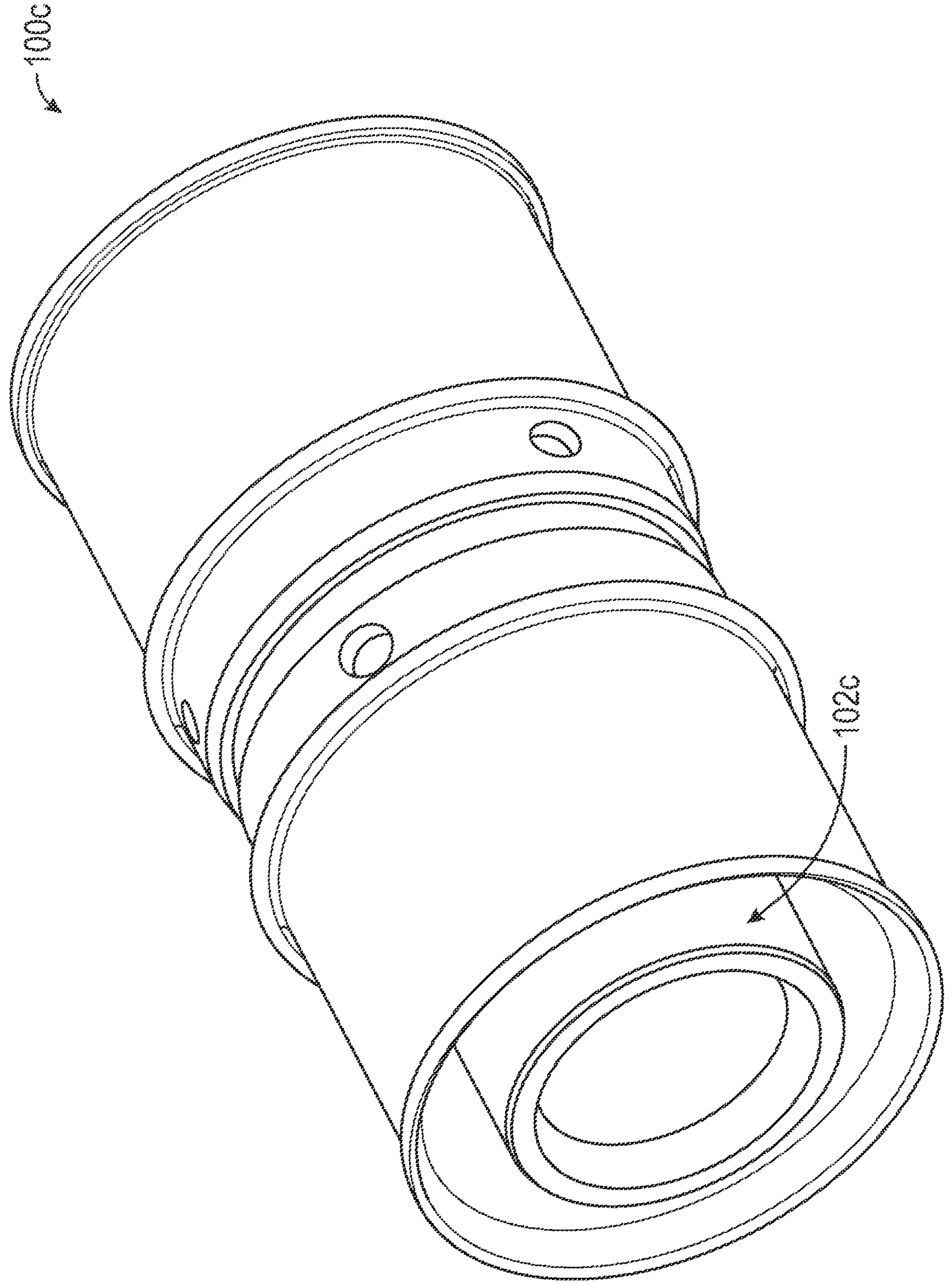
Figure 17:
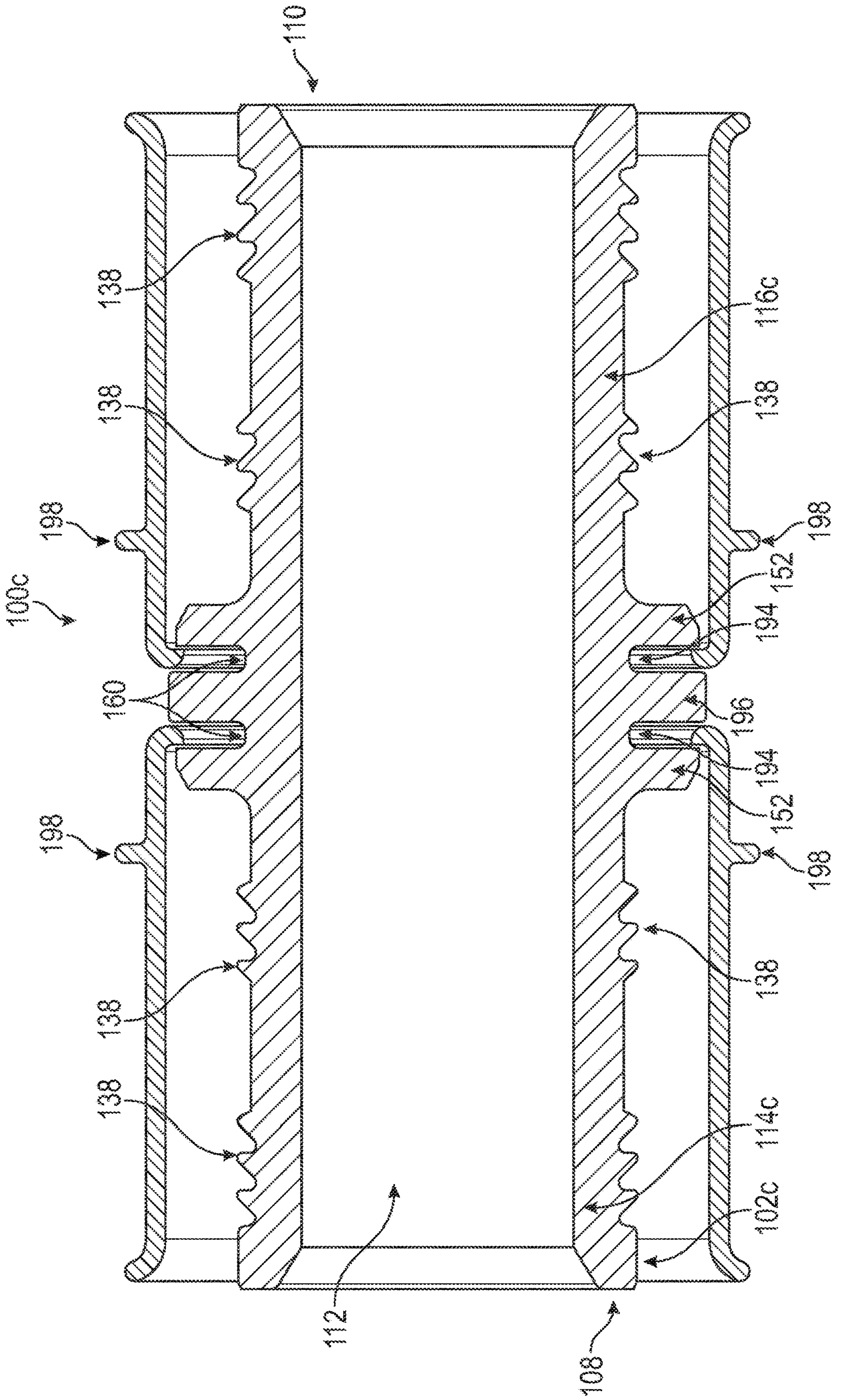

As indicated in FIGS. 14-15, the press fitting 100*b* can include a connector body 102*b* and first and second press sleeves 104*b*, 106*b*. As indicated in FIGS. 16-17, the press fitting 100*c* can include a connector body 102*c* and first and second press sleeves 104*c*, 106*c*. The connector bodies 102*b*, 102*c* can be formed from a metallic material, such as brass (as indicated in FIGS. 14-15) or can be formed from a polymeric material, such as PPSU, PSU, or PPS, though other materials are possible.

Except where distinguished, the connector bodies 102*b*, 102*c* share the same basic features as the connector body 102 described above. That is, the connector bodies 102*b*, 102*c* can respectively include first and second connection segments 114*b*, 114*c*, 116*b*, 116*c*.

The connector bodies 102*b*, 102*c* also define a passage 112 therethrough that places first and second ends 108, 110 of the respective first and second connection segments 114*b*, 114*c*, 116*b*, 116*c* into fluid communication with each other. The first and second connection segments 114*b*, 114*c*, 116*b*, 116*c* can include a plurality of ribs 138 (i.e., barded portions) defined therealong. The press sleeves 104*b*, 104*c*, 106*b*, 106*c*, can be received along the plurality of ribs 138 of the respective connector bodies 102*b* 102*c*. For example, the first and second press sleeves 104*b*, 104*c*, 106*b*, 106*c* can be pressed or crimped to engage a conduit positioned between the first and second press sleeves 104*b*, 104*c*, 106*b*, 106*c* and the plurality of ribs 138 of the respective connector bodies 102*b*, 102*c*. As such, the first and second press sleeves 104*b*, 104*c*, 106*b*, 106*c* are configured to deform upon pressing or crimping to engage an outer surface of a conduit. Upon crimping, the plurality of ribs 138 of the respective connector bodies 102*b*, 102*c* may dig into or otherwise engage an inner surface of the conduit to form an inner diameter (ID) seal with the conduit.

The connector bodies 102*b*, 102*c* may include channels 160 (e.g., grooves) defined along an outer surface thereof similar to connector body 102. The first and second press sleeves 104*b*, 104*c*, 106*b*, 106*c* can each include end portions 194 that are configured to be received within respective channels 160 of the connector bodies 102*b*, 102*c* to facilitate connection of the first and second press sleeves 104*b*, 104*c* 106*b*, 106*c*, to the connector bodies 102*b*, 102*c*. The end portions 194 of the respective first and second press sleeves 104*b*, 104*c*, 106*b*, 106*c* can be a lipped or curved end portion, although alternatives are possible.

The connector bodies 102*b*, 102*c* may further include circumferential walls or portions (e.g., protrusions, flanges) that at least partially define channels in the respective connector bodies 102*b*, 102*c*. In the illustrated embodiments shown in FIGS. 14-17, the connector bodies 102*b*, 102*c* each include a middle or center flange 196 and circumferential walls 152. The circumferential walls 152 may be positioned on opposing sides of the center flange 196, although alternatives are possible. The middle flange 196 and the circumferential walls 152 together define a pair of channels 160 in the respective connector bodies 102*b*, 102*c*.

The end portions 194 of the respective first and second press sleeves 104*b*, 104*c*, 106*b*, 106*c* can engage the respective channels 160 to facilitate connection of the first and second press sleeves 104*b*, 104*c* 106*b*, 106*c* to the connector bodies 102*b*, 102*c*. This construction allows for direct connection of the respective first and second press sleeves 104*b*, 104*c*, 106*b*, 106*c* to the connector bodies 102*b*, 102*c* (i.e., direct engagement of the respective first and second press sleeves with the connector bodies without any intermediate portions or components).

The respective first and second press sleeves 104*b*, 104*c*, 106*b*, 106*c* may further include locator ribs or portions to help facilitate location of a pressing tool used to press or crimp pressing sleeves. As indicated in FIGS. 14-19, the press sleeves 104*b*, 104*c*, 106*b*, 106*c* can include locator ribs 198*a*. The locator ribs 198*a* are integrally formed with a body of the respective first and second press sleeves 104*b*, 104*c*, 106*b*, 106*c*.

Figure 19:
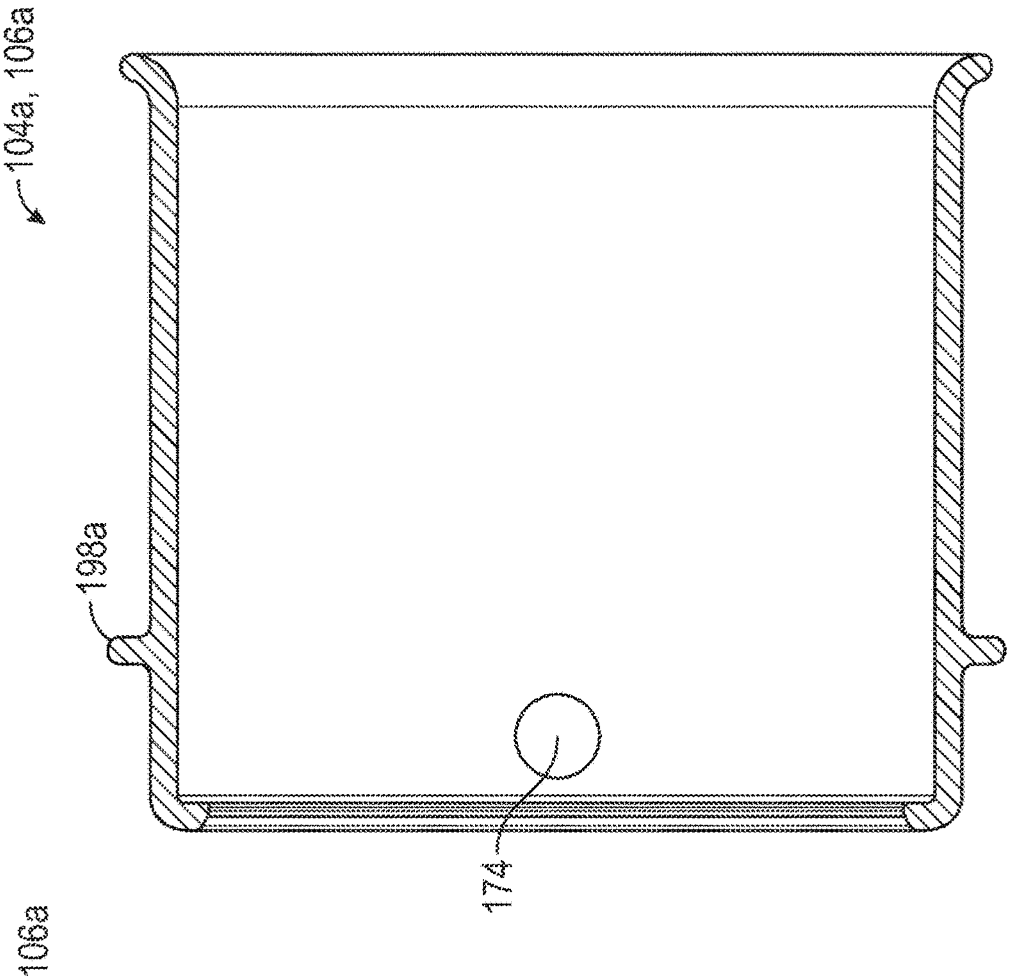
FIGS. 18-19 illustrate another example press sleeve including locating ribs or portions integrated or integrally formed with a body of the press sleeve in accordance with the principles of the present disclosure.
Figure 18:
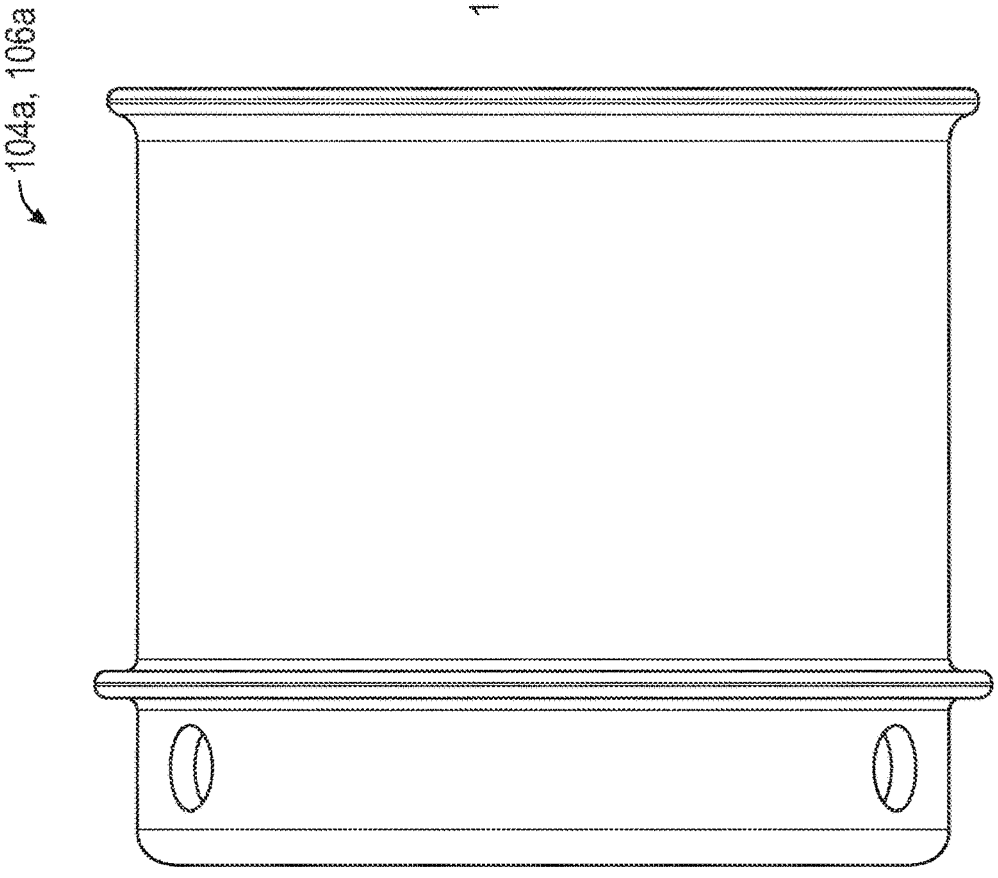
Figure 21:
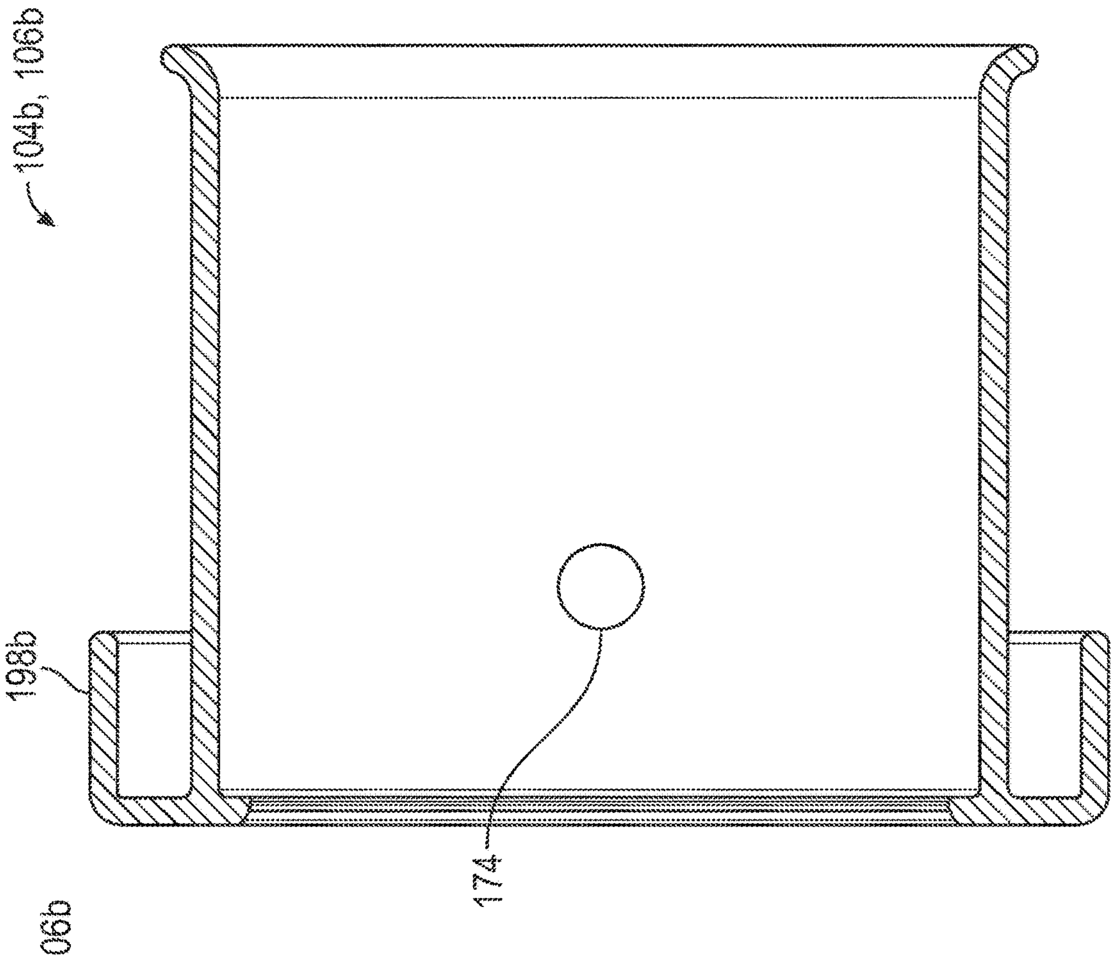
FIGS. 20-21 illustrate another example press sleeve including a flange member integrated or integrally formed with a body of the press sleeve in accordance with the principles of the present disclosure.
Figure 20:
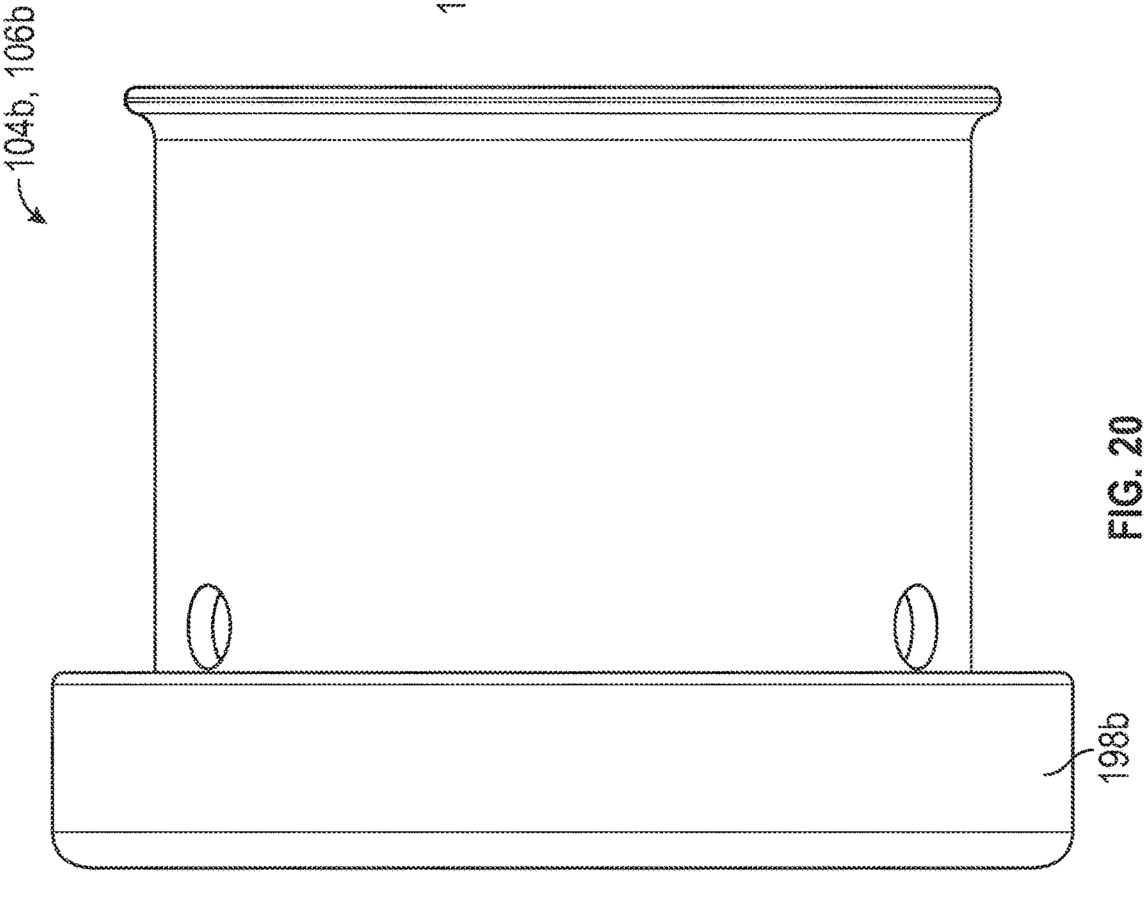
Figure 22:
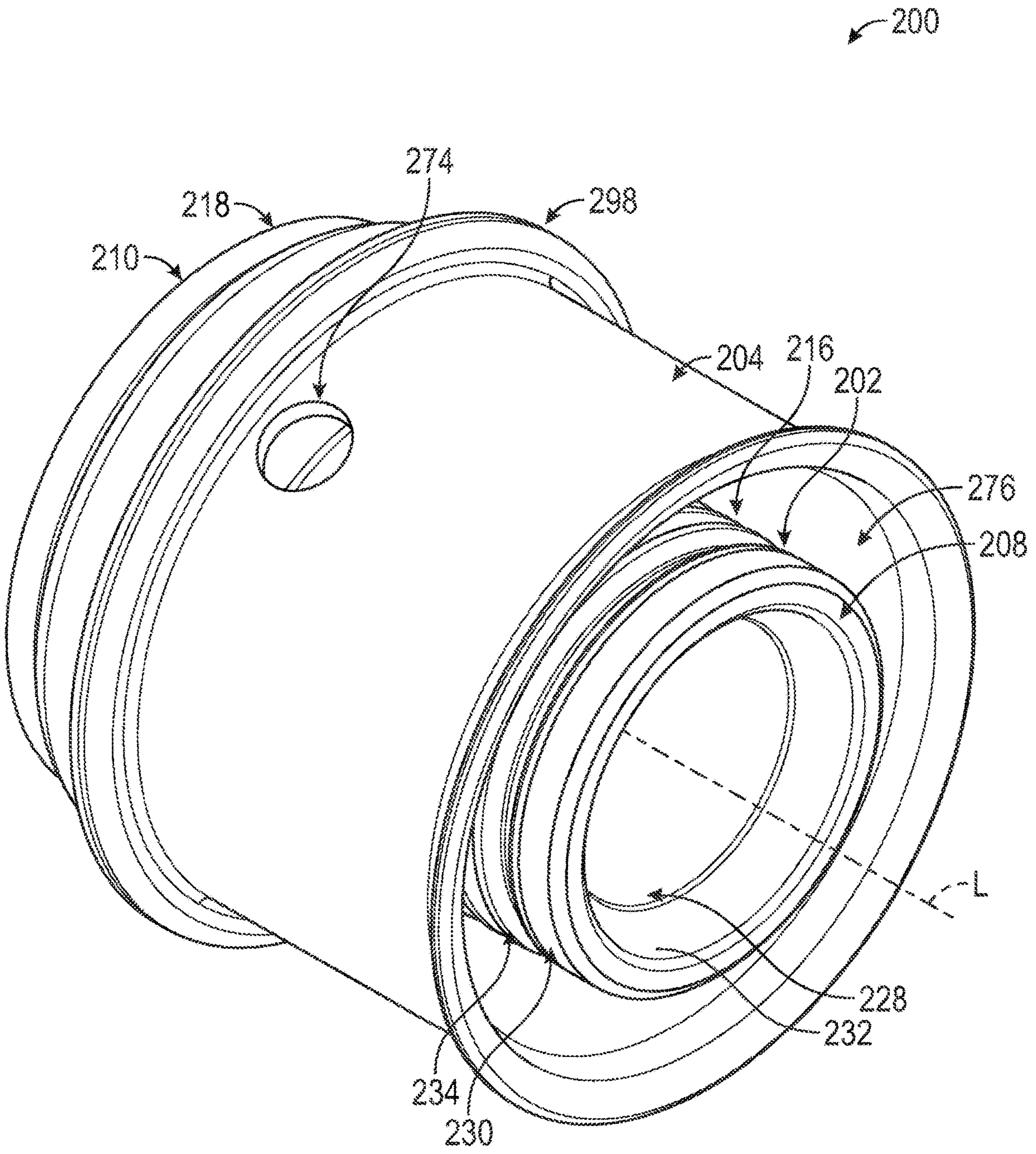
FIG. 22 is a perspective view illustrating another example of a press fitting in accordance with the principles of the present disclosure.
Figure 23:
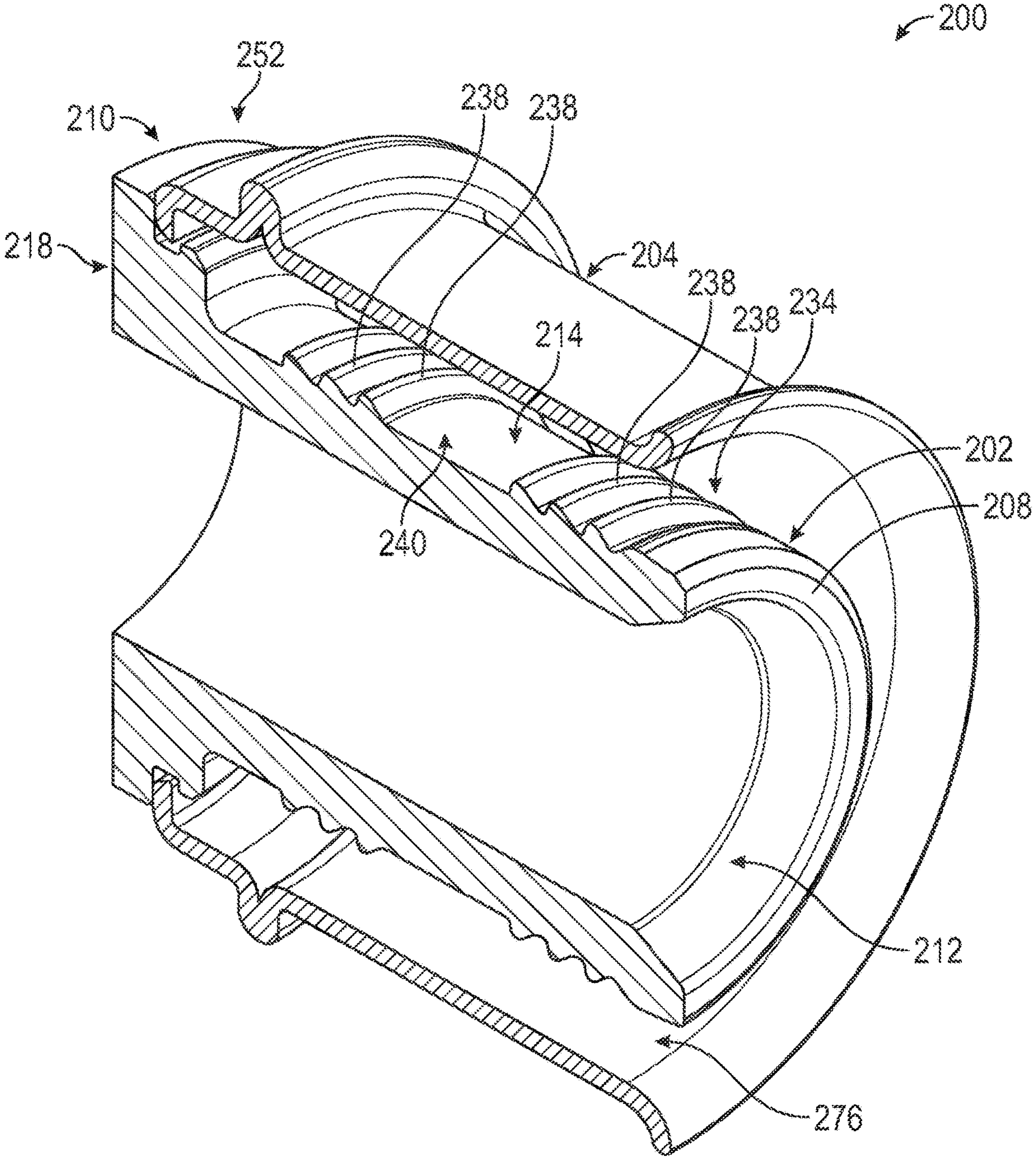
FIG. 23 is a cross-sectional, perspective view of the press fitting from FIG. 22.
Figure 24:
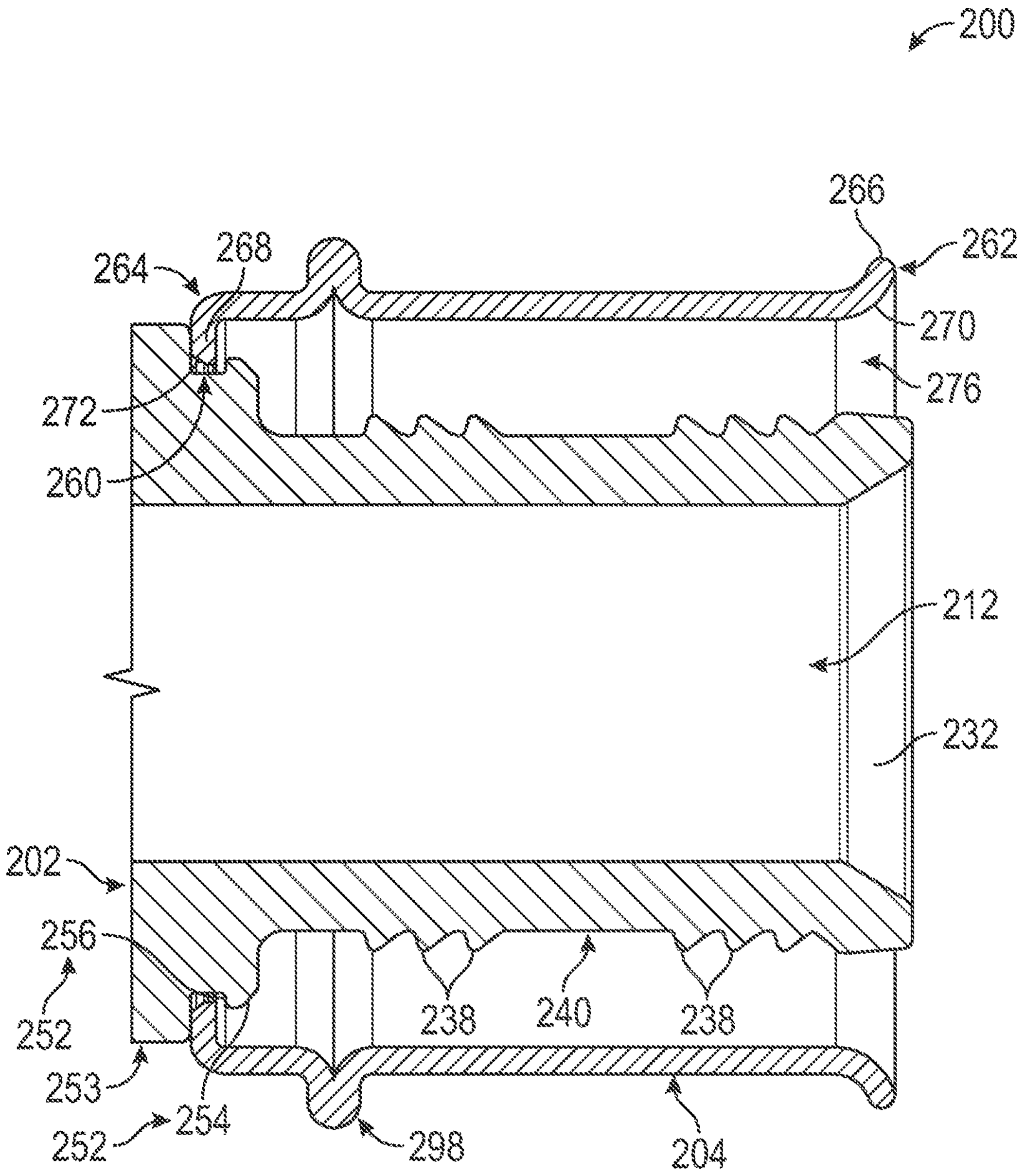
FIG. 24 is a cross-section of the press fitting from FIG. 22.
Figure 25:
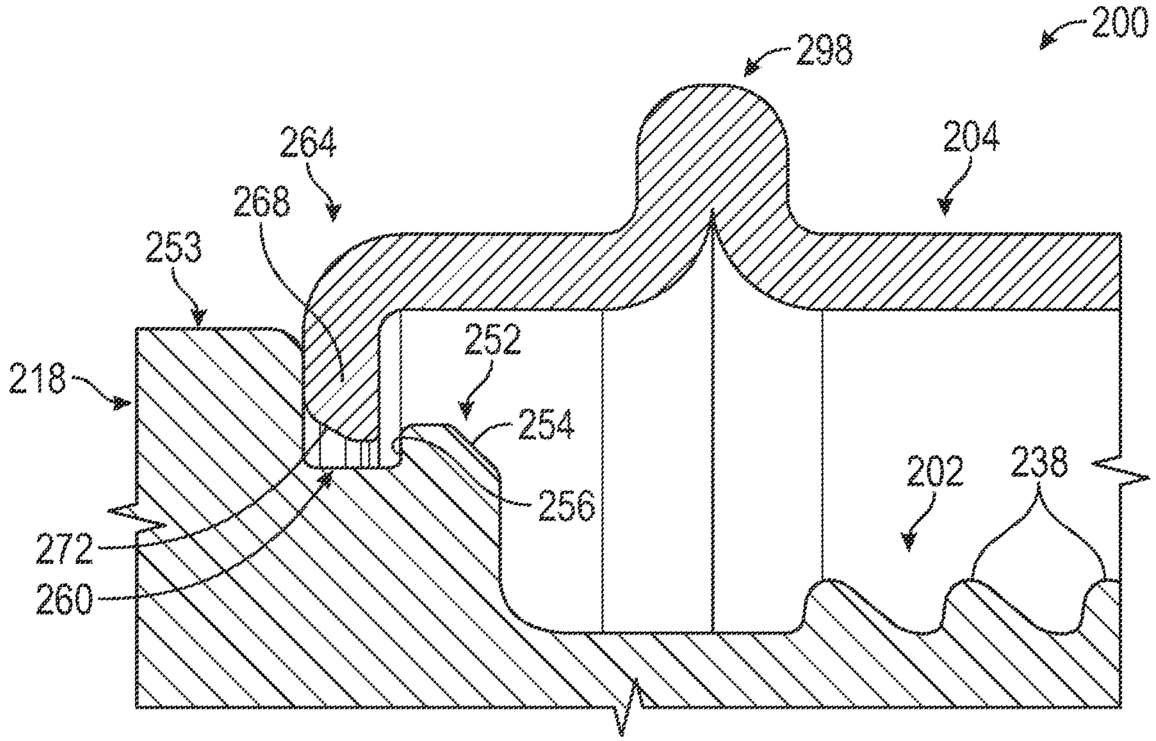
FIG. 25 is an enlarged portion of the cross-section from FIG. 24.

Turing to FIGS. 18-19, the locator ribs 198*a* may include protrusions along an outer surface of the first and second press sleeves 104*b*, 104*c*, 106*b*, 106*c*, although alternatives are possible. FIGS. 20-21 show that the locator ribs 198*b* can include a cross-sectional L-shaped portion respectively formed at an end of the first and second press sleeves 104*b*, 104*c*, 106*b*, 106*c*, although alternatives are possible. The cross-sectional L-shaped portions of the first and second press sleeves 104*b*, 104*c*, 106*b*, 106*c* can include the end portions 194 that are configured to engage the channels 160 defined by the respective connector bodies 102*b*, 102*c*.

FIGS. 18-21 further show one or more openings or holes 174 defined through the body of the first and second press sleeves 104*b*, 104*c*, 106*b*, 106*c*. The one or more openings 174 allow for viewing of insertion of a conduit(s) into a press fitting.

Another embodiment of a press fitting 200 in accordance with the principles of the present disclosure, is shown in FIGS. 22-30. The press fitting 200 includes a connector body 202 and a press sleeve 204. The press fitting 200 may be made in a variety of configurations and sizes that are designed to handle various fluid applications as described above in connection with press fitting 100. The connector body 202 of the press fitting 200 includes a single piece/unitary body made of a plastic or other polymeric material, such as polyphenylsulfone (PPSU), although alternatives are possible.

The connector body 202 has a first end 208, an opposite, second end 210 and a passage 212 (e.g., bore) that extends through the first and second ends 208, 210 along a longitudinal axis L thereof, placing the first and second ends 208, 210 in fluid communication. The connector body 202 may include a connection segment 214 at the first end 208 of the connector body 102 and a retainer portion 218 at the second end 210. In some embodiments, the connector body 202 can include two or more connection segments. The connection segment 214 may be cylindrical and extend along the longitudinal axis L. The connection segment 214 is sized and configured for reception within a passage of a respective conduit (e.g., pipes, tubes) to form an inner diameter ID seal with the conduit. The press sleeve 204 is configured to be received over the connection segment 214. The press sleeve 204 is pre-installed onto the connector body 202 for ease of installation. The press sleeve 204 is deformable and configured to be engaged and thereby deformed by a press or crimp tool to connect conduits to the press fitting 200.

The connection segment 214 defines inner surfaces (e.g., interior surfaces) 228 and outer surfaces 230 (e.g., exterior surfaces). In certain examples, the inner surfaces 228 of the connection segment 214 of the connector body 202 include a tapered lead-in 232 at the first end 208 of the passage 212 to allow for ease of fluid flow therethrough or in some applications for ease of insertion of a liner (not shown).

The outer surfaces 230 of the connection segment 214 may have multiple surface portions 234 dimensioned to engage inner walls of the conduit to facilitate gripping or other engagement therewith. The surface portions 234 on the outer surfaces 230 of the connection segment 214 may include barbed portions. In certain examples, the barbed portions include a plurality of ribs 238 on the outer surface 230 of the connector body 202 to assist in coupling the connector body 202 to a respective conduit. In the example shown, the connection segment 214 includes two surface portions 234 on the outer surfaces 230 that respectively define an annular recessed zone 240 therebetween.

The connector body 202 may also include circumferential walls or portions 252, 253 (e.g., protrusions, flanges) radially projecting from the outer surface 230 thereof. One of the circumferential walls 252 form an inclined surface 254 (e.g., sloped surface). The circumferential wall 252 also includes an engagement surface 256 opposite the inclined surface 254. The inclined surface 254 of the circumferential wall 252 inclines in a direction from the engagement surface 256. The other of the circumferential walls 253 is spaced axially apart from circumferential wall 252 to define a channel 260 axially therebetween. The circumferential walls 252, 253 may be integrally formed as one piece or unitary with the connector body 202.

Figure 26:
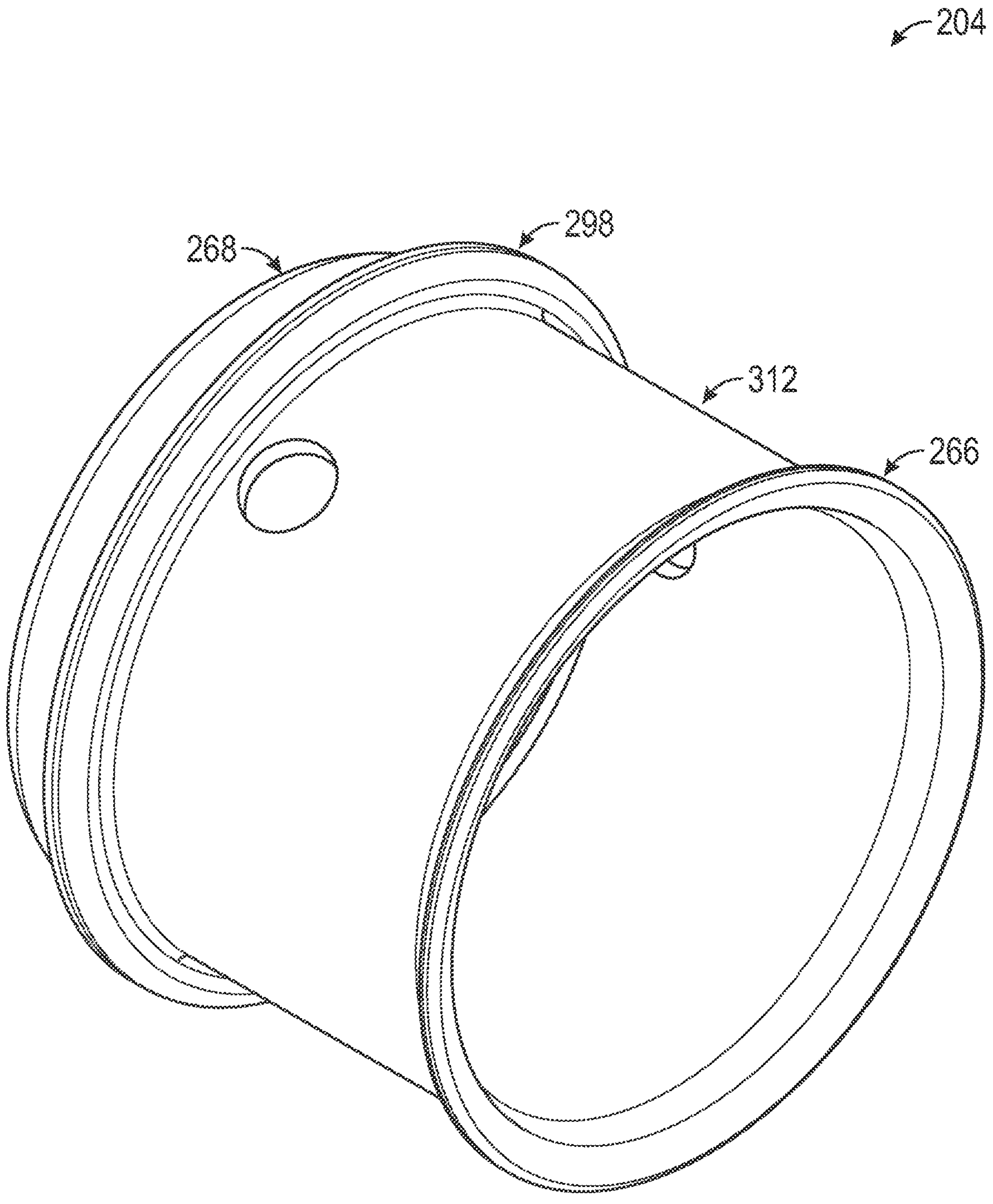
FIG. 26 is a perspective view of a press sleeve included in the press fitting of FIG. 22.
Figure 27:
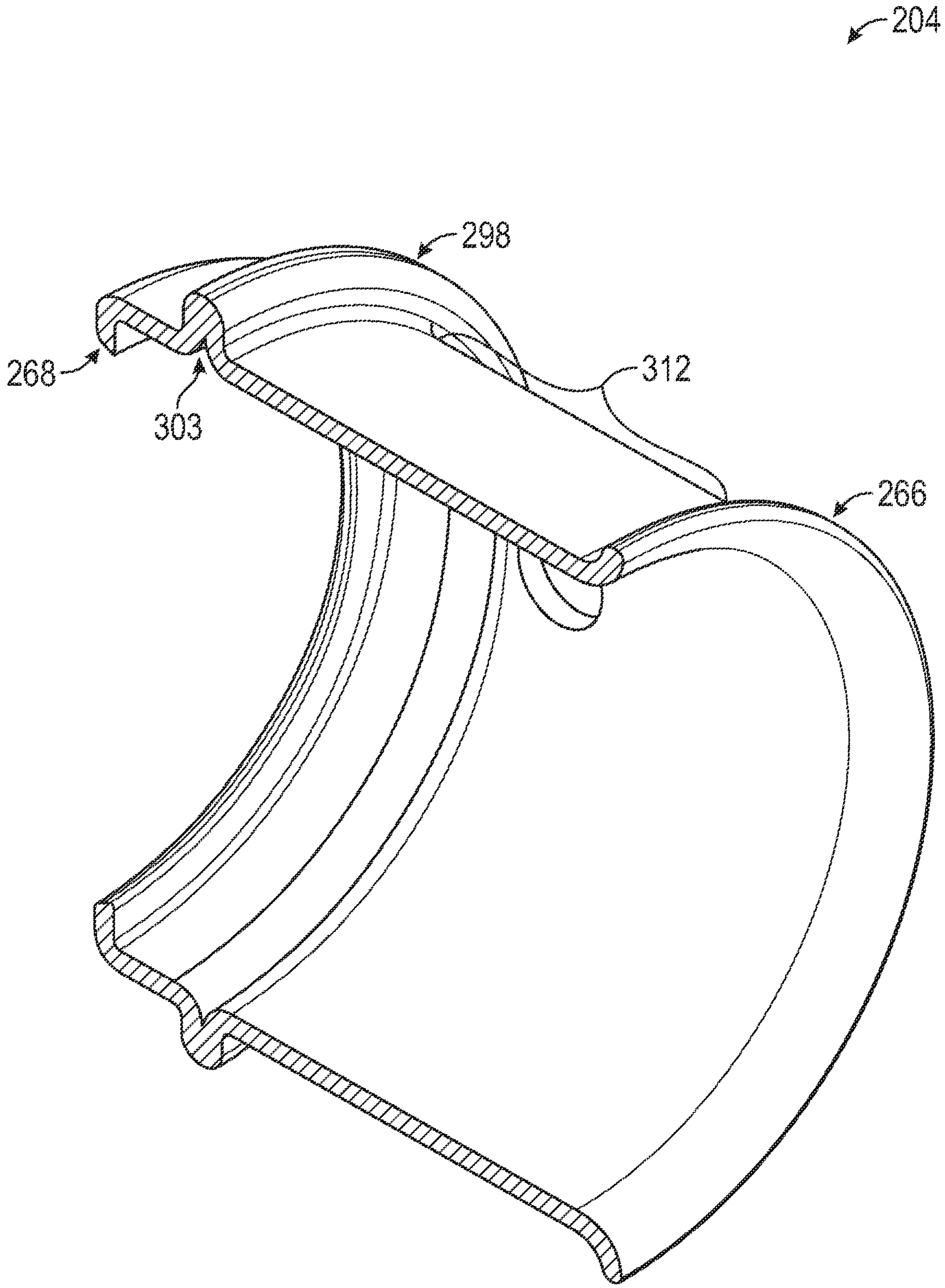
FIG. 27 is a cross-sectional, perspective view of the press sleeve of FIG. 26.

The press sleeve 204 may be formed from a metallic material, such as, stainless steel or other metallic material, such as copper, aluminum, or other suitable metallic material. The press sleeve 204 includes a distal (e.g., first) end 262 and an opposite proximal (e.g., second) end 264. The distal end 262 of the press sleeve 204 includes a flange 266 and the proximal end 264 of the press sleeve 204 includes a lip 268 as shown in FIGS. 26 and 27. The flange 266 at the distal end 262 of the press sleeve 204 includes a curved edge 270 (e.g., a tapered lead-in). The lip 268 at the proximal end 264 of the press sleeve 204 includes a chamfered edge 272. The chamfered surface may have an angle more than 10 degrees, such as more than 15 degrees, more than 20 degrees, more than 25 degrees, more than 30 degrees, more than 40 degrees, more than 45 degree, etc. When the press sleeve 204 is coupled together with the connector body, the lip 268 of the press sleeve 204 extends into the channel 260 between the circumferential walls 252, 253 to facilitate attachment of the connector body 202 and the press sleeve 204. The press sleeve 204 also includes holes 274 defined therein for allowing viewing therethrough, such that a conduit that is inserted into the fitting is viewable.

The press sleeve 104 is shown connected to the connector body 102 in FIGS. 22-25. The press sleeve 204 and the connector body 202 together define a passageway 276 for receiving the conduit. When the conduits are fully inserted into the passageway 276, an end face of the conduit may abut the engagement surface 256 of the circumferential wall 252. The holes 274 of the press sleeve 204 allow an installer to visually see where the conduit is positioned during insertion, namely, whether the conduit has been inserted into the passageway 276 a sufficient amount.

Figure 28:
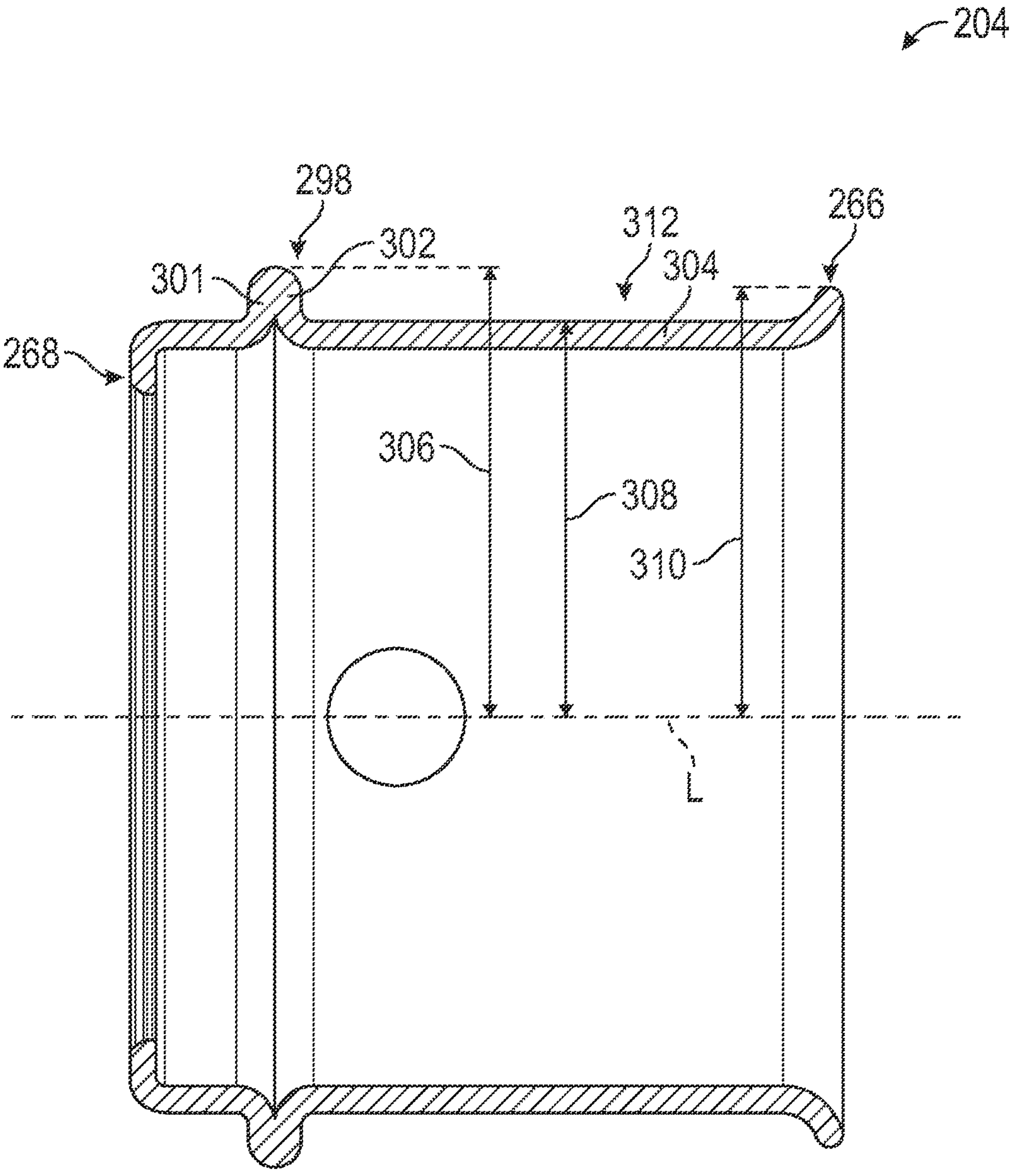
FIG. 28 is a cross-section of the press sleeve from FIG. 26.
Figure 29:
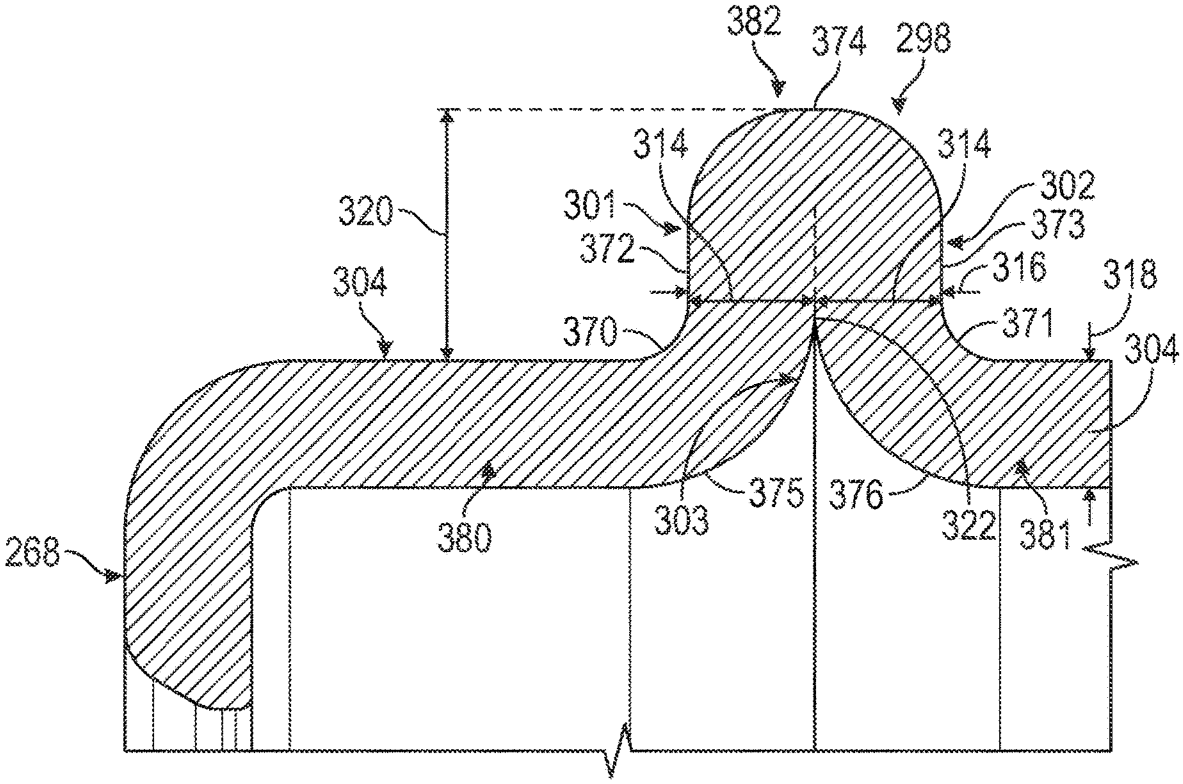
FIG. 29 is an enlarged portion of the cross-section from FIG. 28.
Figure 30:
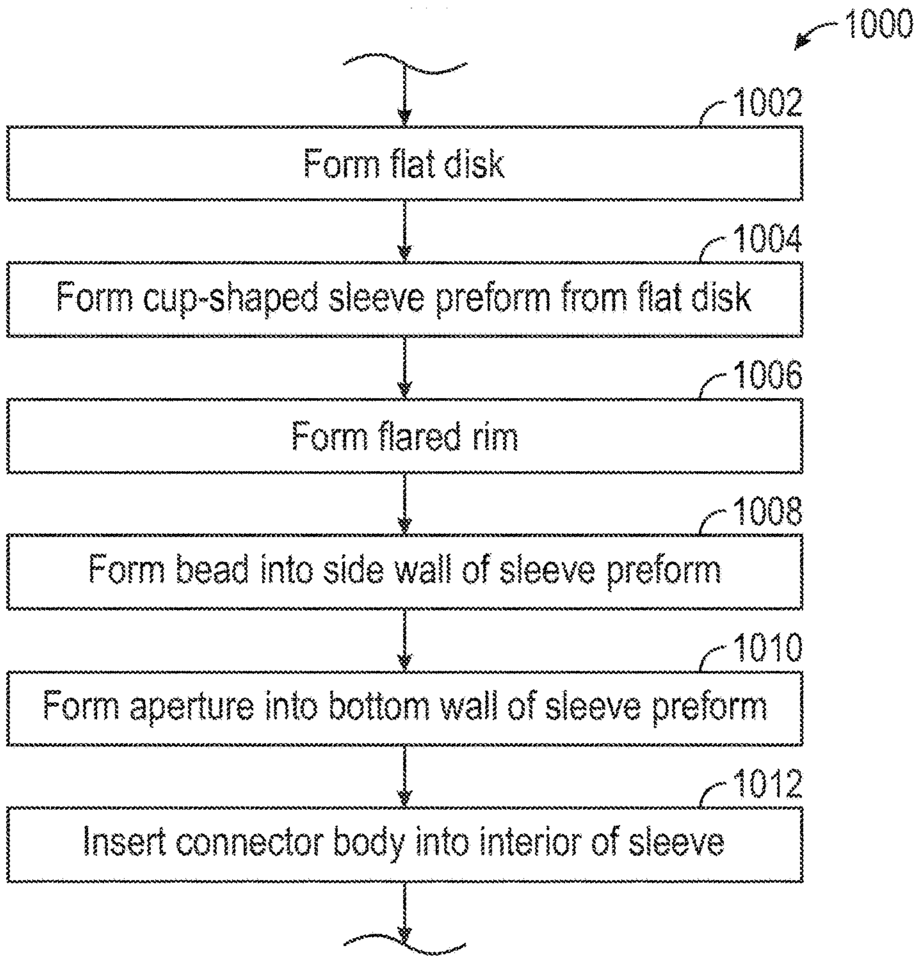
FIG. 30 is a flow chart of an example process by which the press sleeve of FIG. 26 is formed and installed on a connector body also included in the press fitting of FIG. 22.

The press sleeves 204 may further include a locator rib 298 or portions to help facilitate location of a pressing tool used to press or crimp pressing sleeves as shown in FIGS. 28-30. The locator rib 298 is integrally formed with a body of the press sleeve 204. The locator rib 298 and the flange 266 provide a crimp region therebetween which is configured to receive the crimp tool.

As shown in FIGS. 29 and 30, the locator rib 298 includes overlapping first and second rib portions 301, 302. The first and second rib portions 301, 302 of the locator rib 298 each extend outwardly away from a sleeve body 304 to establish a radius 306 that is larger than a radius 308 of the sleeve body 304 as shown in FIG. 29. The flange 266 at the distal end 262 of the press sleeve 204 illustratively has a radius 310 that is larger than the radius 308 of the sleeve body 304 but smaller than the radius 306 of the locator rib 298. The locator rib 298 and the flange 266 define a crimp region 312 axially therebetween which is used facilitate location of a crimp tool as shown in FIGS. 26 and 27.

In certain embodiments, the radius 306 of the locator rib 298 is at least 5 percent greater than the radius 308 of the sleeve body 304. In certain embodiments, the radius 306 of the locator rib 298 is at least 6 percent greater than the radius 308 of the sleeve body 304. In certain embodiments, the radius 306 of the locator rib 298 is at least 7 percent greater than the radius 308 of the sleeve body 304. In certain embodiments, the radius 306 of the locator rib 298 is at least 8 percent greater than the radius 308 of the sleeve body 304. In certain embodiments, the radius 306 of the locator rib 298 is at least 9 percent greater than the radius 308 of the sleeve body 304. In certain embodiments, the radius 306 of the locator rib 298 is at least 10 percent greater than the radius 308 of the sleeve body 304. In certain embodiments, the radius 306 of the locator rib 298 is at least 11 percent greater than the radius 308 of the sleeve body 304. In certain embodiments, the radius 306 of the locator rib 298 is at least 12 percent greater than the radius 308 of the sleeve body 304. In certain embodiments, the radius 306 of the locator rib 298 is at least 13 percent greater than the radius 308 of the sleeve body 304. In certain embodiments, the radius 306 of the locator rib 298 is at least 14 percent greater than the radius 308 of the sleeve body 304. In certain embodiments, the radius 306 of the locator rib 298 is at least 15 percent greater than the radius 308 of the sleeve body 304.

Figure 32:
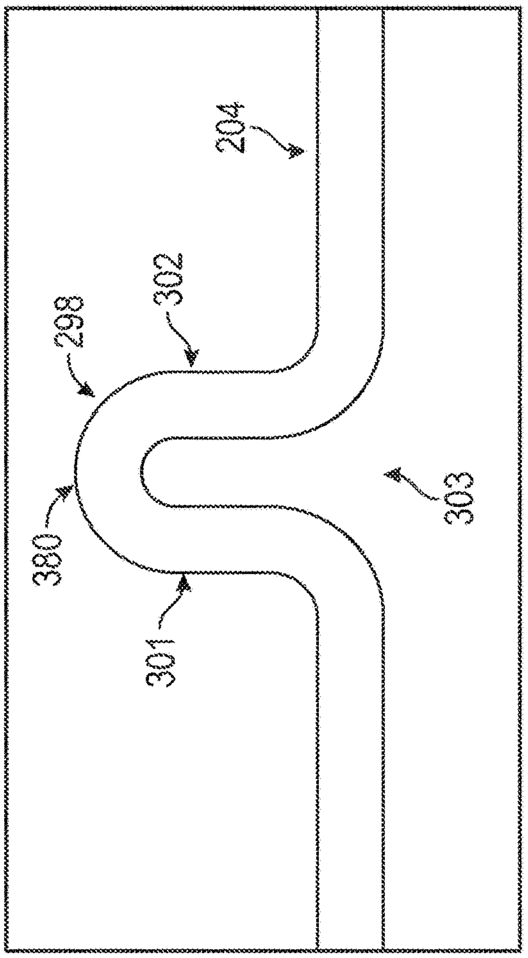
FIG. 32 is a cross sectional view of a portion of another press sleeve with a locator rib.

The first and second rib portions 301, 302 of the locator rib 298 are folded against each other as the press sleeve 204 is formed. That is, the first and second rib portions 301, 302 may overlap to provide a contact area therebetween. In the illustrative embodiment, a gap or space 303 is also be provided between at least some area of the rib portions 301, 302 as shown in FIGS. 27 and 29. The gap 303 extends annularly around the longitudinal axis L. In some embodiments, the gap 303 may be omitted such that the portions 301, 302 contact one another along their entire radial extent. In other embodiments, the first and second rib portions 310, 302 may be completely spaced apart from one another such that the gap 303 extends all the way to a bent portion 382 of the locator rib 298 as shown in FIG. 32.

Referring to FIG. 29, the fully-formed locator rib 298 includes a plurality of exterior surfaces 370, 371, 372, 373, 374 and a plurality of interior surfaces 375, 376. The exterior surfaces of the locator rib 298 includes a pair of curved exterior surfaces 370, 371, a pair of radially-extending exterior surfaces 372, 373, and a dome-shaped exterior surface 374. The interior surfaces of the locator rib 298 includes a first curved interior surface 375 and a second curved interior surface 376.

The pair of curved exterior surfaces 370, 371 are coupled to relatively straight portions of the sleeve 204 and transition between the straight portions and the rest of the locator rib 298. The pair of radially-extending exterior surfaces 372, 373 extend outwardly from each respective curved exterior surface 370, 371 of the locator rib 298. The dome-shaped exterior surface 374 interconnects radially outer ends of the axially-extending exterior surfaces 372, 373 and defines an outermost portion of the locator rib 298. The dome-shaped exterior surface 374 of the locator rib 298 also defines an outermost portion of the entire press sleeve 204, however, in some embodiments, this may not be the case.

The first and second curved interior surfaces 375, 376 are convex relative to one another as shown in FIG. 29. The first and second curved interior surfaces 375, 376 also extend radially outward and converge at an apex 322 where the first and second curved interior surfaces 375, 376 are joined to one another. The first and second curved interior surfaces 375, 376 define the gap 303 therebetween.

The press sleeve 204 can be formed to have a continuous structure without seams or joint lines. For example, the structure of the press sleeve 204 transitions from a first straight portion 380 to the first rib portion 301 which includes one of the curved exterior surfaces 370, one of the radially-extending exterior surfaces 372, and the first curved interior surface 375. The press sleeve 204 then transitions from the first rib portion 301 to a bent or deformed portion 382 which includes the dome-shaped exterior surface 374. The press sleeve 204 then transitions to the second rib portion 302 which includes the other of the radially-extending surfaces 373, the other of the curved exterior surfaces 371, and the second curved interior surface 376. The press sleeve 204 transitions from the second rib portion 302 to a second straight portion 381. The second straight portion 381 is located at substantially the same radial spacing from the longitudinal axis L as the first straight portion 380. The press sleeve 204 maintains this radial spacing from the longitudinal axis L all the way to the flange 266.

The first and second rib portions 301, 302 of the locator rib 298 each have a thickness 314 that is about equal (i.e., within 1%) to one another as shown in FIG. 30. Thus, a cumulative axial thickness 316 of the locator rib 298 is about twice the thickness 314 of the first and second rib portions 301, 302. The cumulative axial thickness 316 of the locator rib 298 may also be about twice a thickness 318 of the sleeve body 304 so that the locator rib 298 is adequately reinforced when the crimp region 312 of the sleeve body 304 is crimped. As used herein, the term “about” means within 1% of the stated value or proportion.

In certain examples, forming the locator rib 298 during process 1000 may cause the thickness 314 of the first and second rib portions 301, 302 to become slightly thinner than the thickness 318 of the sleeve body 304. The cumulative thickness 316 may still be larger than the thickness 318 of the sleeve body 304.

The locator rib 298 is formed to include a radial height 320 from the sleeve body 304 as shown in FIG. 30. The radial height 320 is about equal to the cumulative axial thickness 316 of the locator rib 298 in the illustrative embodiment. In this way, the height 320 is minimized to save cost and material use as the sleeve body 304 is deformed during process 1000 to form rib portions 301, 302. In certain examples, the height 320 may be greater than the thickness 318 of the sleeve body 304.

Figure 30A:
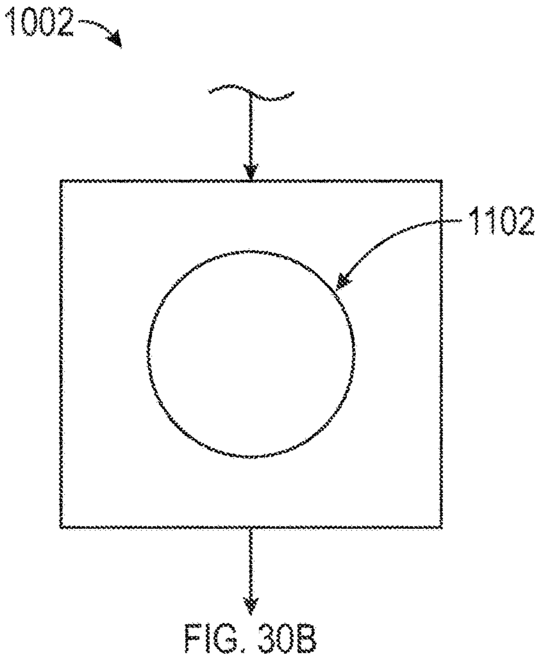
FIG. 30A is shows a first step included in the process of FIG. 30.
Figure 30B:
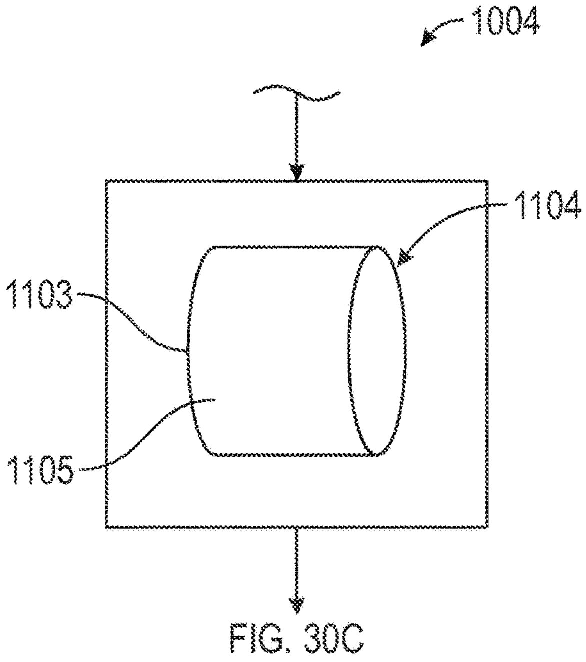
FIG. 30B is shows a second step included in the process of FIG. 30.
Figure 30C:
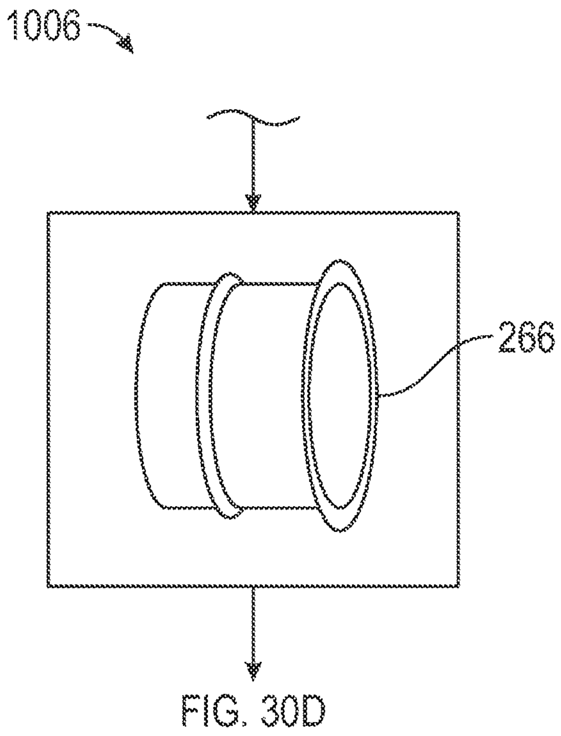
FIG. 30C is shows a third step included in the process of FIG. 30.
Figure 30D:
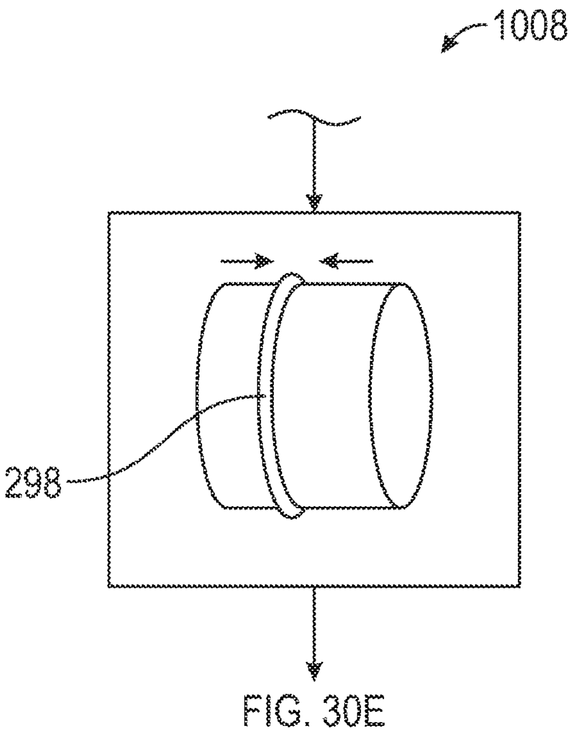
FIG. 30D is shows a fourth step included in the process of FIG. 30.
Figure 30E:
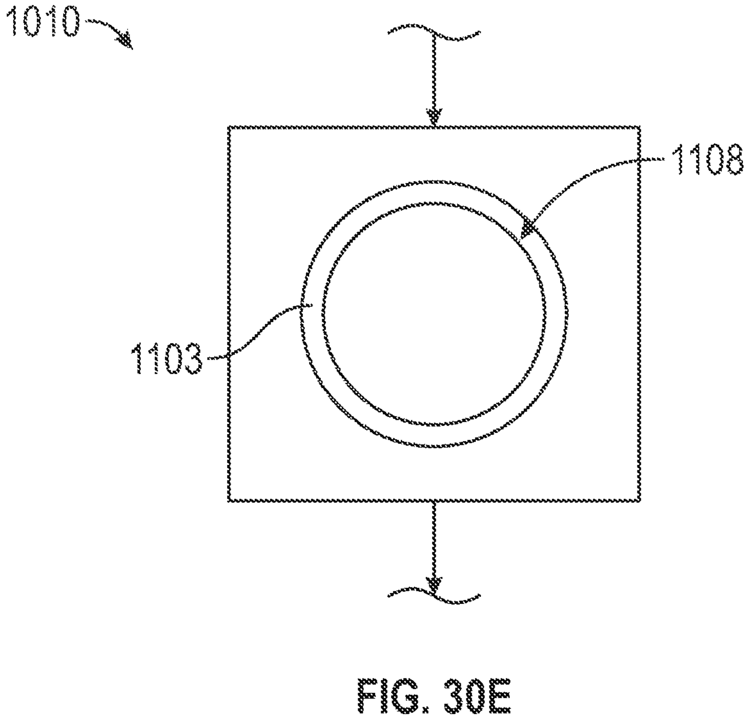
FIG. 30E is shows a fifth step included in the process of FIG. 30.

The press sleeve 204 may be formed as a part of a process 1000 of forming a press fitting 200 as shown in FIGS. 30-30E. The process 1000 begins with step 1002 including forming a flat disk 1102 from which the press sleeve 204 is formed as shown in FIGS. 30 and 30A. The flat disk 1102 may originally be formed from a sheet of metallic material that is trimmed or cut to provide the flat disk 1102. The flat disk 1102 can have a generally circular shape, however, any suitable shape, such as oval, rectangle, square, etc., can be used in the process 1000.

The process 1000 may include a step 1004 of forming a cup-shaped sleeve preform 1104 from the flat disk 1102 as shown in FIGS. 30 and 30B. The cup-shaped sleeve preform 1104 may be formed by deep drawing the flat disk 1102 into a mold or mandrel (not shown) to form the cup-shaped sleeve preform 1104 with a bottom wall 1103 and a side wall 1105. In some embodiments, another suitable process for forming the cup-shaped sleeve preform 1104, such as including machining, may be used.

The process 1000 may further include a step 1006 of forming the flange 266 in the cup-shaped sleeve preform 1104 as shown in FIGS. 30 and 30C. The flange 266 is formed using a flaring mandrel that engages and expands the end of the sleeve 1104. In the illustrative embodiment, the step 1006 of forming the flange 266 is performed during the step 1004 of forming the cup-shaped sleeve preform 1104. The flange 266 may be formed separately from step 1004, such as during, before, or after step 1004, step 1008, and/or step 1010 described below.

The process 1000 may include a step 1008 of forming the locator rib 298 into the side wall 1105 of the cup-shaped sleeve preform 1104 as shown in FIGS. 30 and 30D. The locator rib 298 can be formed using a beading process. During step 1008, the side wall 1105 of the cup-shaped sleeve preform 1104 is bent or deformed to form the two rib portions 301, 302 annularly around the longitudinal axis L of the press sleeve 204. This deformation also forms an annular groove 303 which is defined by inner surfaces of the press sleeve 204 facing toward the longitudinal axis L. For example, a mandrel can be used to engage the sidewall 1105 of the cup-shaped sleeve preform 1104 to fold or deform portions of the sidewall 1105, as ends of the cup-shaped sleeve preform 1104 are compressed, to form a folded portion or bead defining the locator rib 298. In certain examples, the locator rib 298 may be formed in a separate mold or step from the mold used in step 1004, however, in other embodiments, the locator rib 298 may be formed during the step 1004 as the cup-shaped sleeve preform 1104 is formed. The locator rib 298 may be formed using alternative processes, such as curing, roll beading, or other suitable processes without departing from the scope of the present disclosure.

The process 1000 may further include a step 1010 of forming an aperture 1108 in the bottom wall 1103 of the cup-shaped sleeve preform 1104 as shown in FIGS. 30 and 30E. The step 1010 of forming the aperture 1108 may provide the lip 268 and the chamfered surface 272 when the press sleeve 204 is fully formed after process 1000. Alternatively, the lip 268 and the chamfered surfaces 272 may be formed in a separate step from step 1010 of the process 1000. The aperture 1108 is formed separately from steps 1004, 1006 in the illustrative embodiment, however, in other embodiments, the aperture 1108 may be formed during the step 1004 and/or step 1006 as the cup-shaped sleeve preform 1104 is formed. The aperture 1108 may be formed by machining, punching, laser cutting, etching, etc.

Once the press sleeve 204 is formed during the process 1000, the process 1000 may further include a step 1012 of coupling the press sleeve 204 to a connector body as shown in FIG. 30. The press sleeve 204 can be coupled to a connector body (i.e., 102, 202) by inserting the connector body into the press sleeve 204 similarly to what is shown in FIGS. 10-12.

Figure 31:
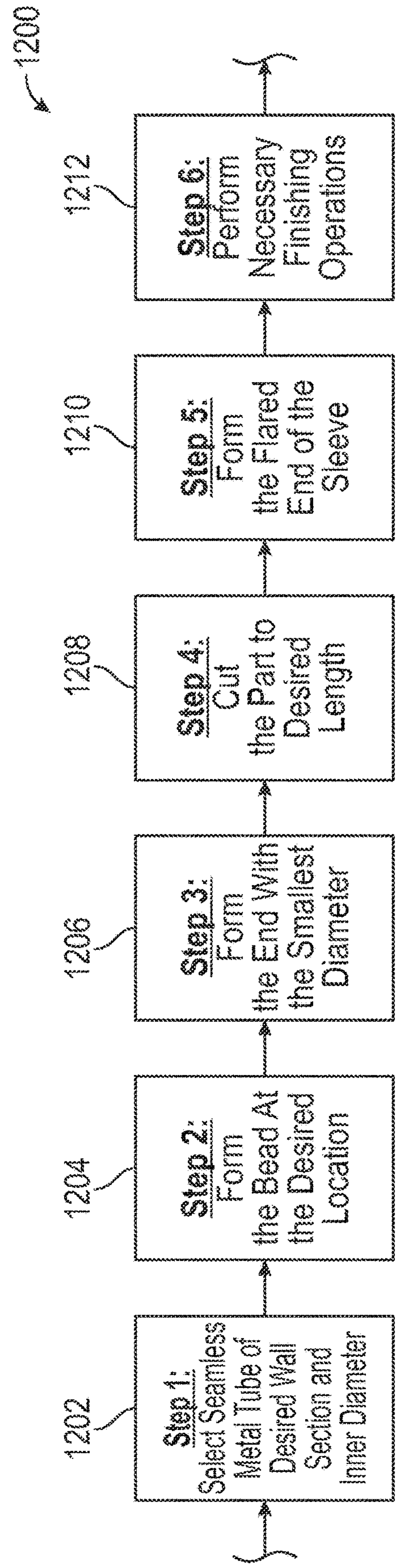
FIG. 31 is a flow chart of another example process by which the press sleeve of FIG. 26 is formed.

Another process 1200 of forming the press sleeve 204 is shown in FIG. 31. The process 1200 includes a step 1202 of selecting a conduit to be used in forming the press sleeve 204. The step 1202 includes selecting a desired outer and inner diameter of the conduit. Depending on how many press sleeves 204 are desired to be formed from the conduit, the step 1202 may include selecting a length of the conduit. In exemplary embodiments, the conduit is a metal conduit and is seamless. The metal conduit is deformable to form features of the press sleeve 204 as described below.

The process 1200 further includes a step 1204 of forming the locator rib 298 in the conduit. The step 1204 may include measuring a distance from an end of the conduit and forming the locator rib 298 at the distance from the end so that the locator rib 298 is positioned correctly once the press sleeve 204 is fully formed. The step of forming the locator rib 298 can include forming multiple locator ribs 298 in the conduit. Each locator rib 298 formed in the conduit will correspond to an individual press sleeve 204 that is trimmed away from the conduit in subsequent steps of the process 1200.

The process 1200 further includes a step 1206 of forming the lip 268 at the proximal end 264 of the press sleeve 204. The step 1206 can include deforming a portion of the conduit inwardly to form the lip 268. The conduit may be sized with a length such that the lip 268 is formed at an end of the conduit. Alternatively, the conduit can be cut during the step 1206 to separate the press sleeve 204 from the rest of the conduit. In this instance, each lip 269 may be formed between two neighboring locator ribs 298 formed in the conduit in step 1204. In some embodiments, the process 1200 may alternate between forming one locator rib 298 and one lip 268 sequentially.

The process 1200 further includes a step 1208 of cutting the conduit to a desired part length. The desired part length corresponds the length of the press sleeve 204 desired after all features have been formed in the press sleeve 204. As previously described, the step 1208 may occur during the step 1206 of forming the lip 268 or may occur after the lip 268 has been formed.

The process 1200 further includes a step 1210 of forming the flared flange 266 at the distal end of the press sleeve 204. The flange 266 may be formed using a flaring mandrel that engages and expands the end of the sleeve 204 opposite the lip 268.

The process 1200 further includes a step 1212 of performing finishing operations on the press sleeve 204. Some exemplary finishing operations include deburring (such as chemical deburring, tumble deburring, media deburring, etc.) and polishing (such as media polishing, chemical polishing, mechanical polishing, etc.). Polishing is generally the final step prior to placing the pressing sleeve on the connector body 202.

Figure 33:
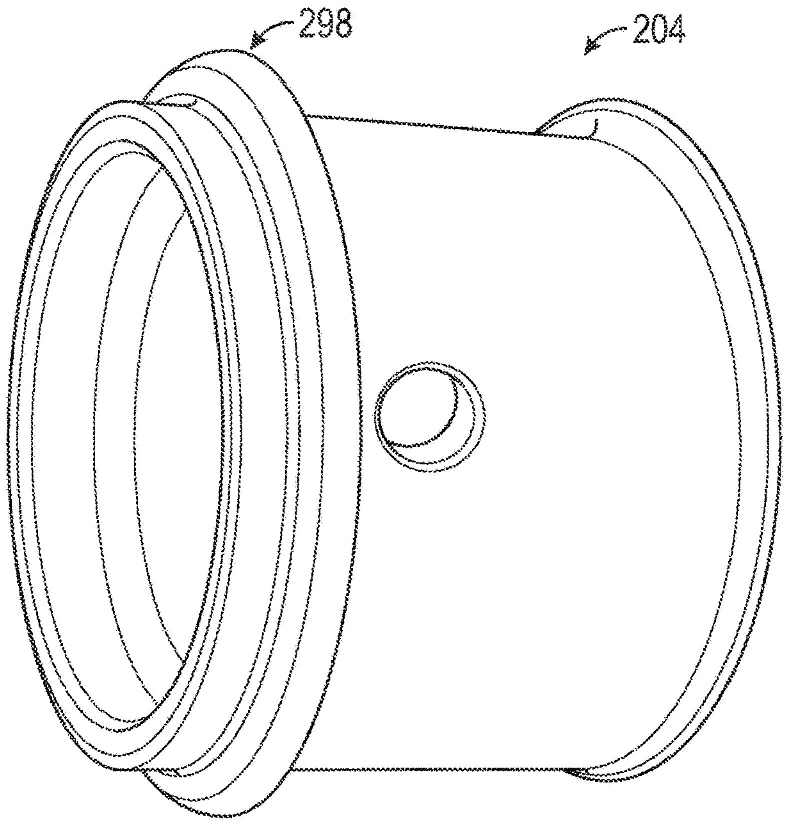
FIG. 33 is a perspective view of the press sleeve shown in FIG. 26.
Figure 34:
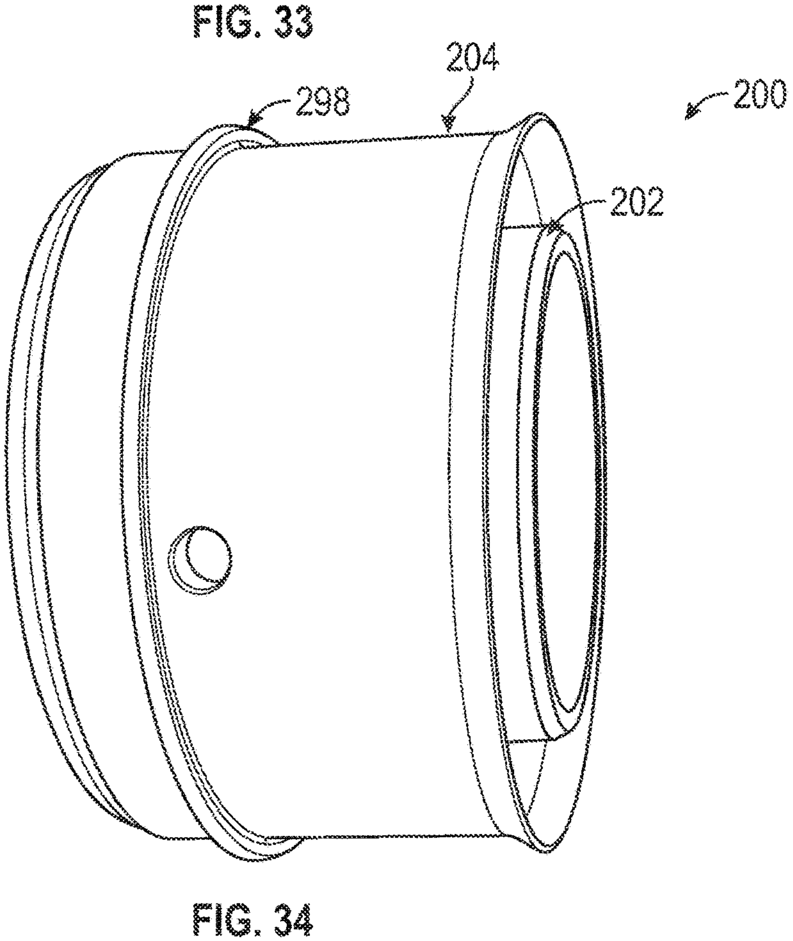
FIG. 34 is a perspective view of the press fitting shown in FIG. 22.
Figure 35:
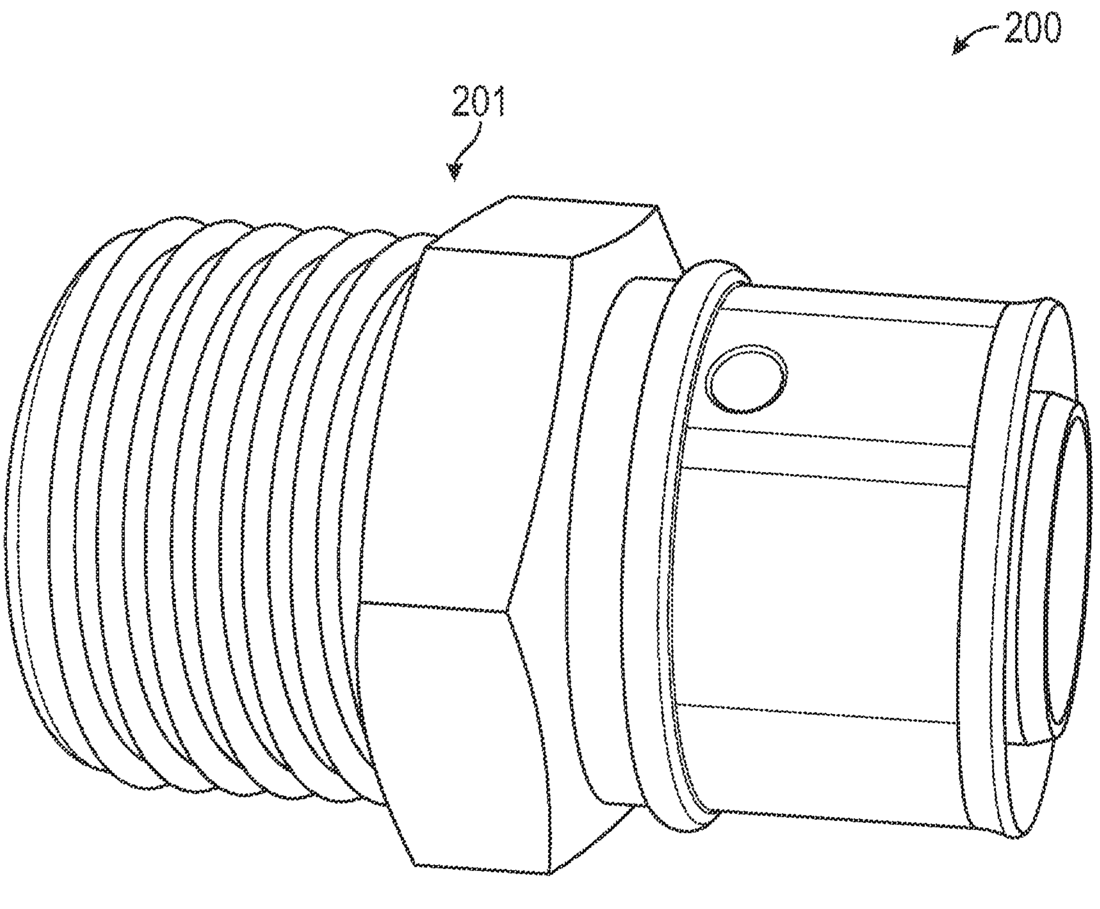
FIG. 35 is a perspective view of the press fitting attached to a threaded pipe connector.

Other views of the press fitting 200 and portions thereof are shown in FIGS. 33-35. FIG. 35 shows the press fitting 200 attached to a threaded pipe connector 201. The threaded pipe connector can be screwed onto a receiving end of a corresponding pipe (not shown). The press fitting 200 then allows that pipe to be coupled with a conduit sized to be used with the press fitting 200.

From the forgoing detailed description, it will be evident that modifications and variations can be made without departing from the spirit and scope of the disclosure.

What is claimed is:

1. A press fitting comprising:

a connector body having a first end, and an opposite, second end, the connector body including a first connection segment at the first end and a second connection segment at the second end, the connector body includes surface portions on outer surfaces of the first and second connection segments, the connector body further includes a circumferential rib centrally positioned between the first and second connection segments, and circumferential walls radially projecting from the connector body on opposing sides of the circumferential rib, wherein the circumferential walls and the circumferential rib together define respective channels in the connector body, the circumferential rib and the circumferential walls being integrally formed with the connector body;

a first press sleeve adapted to be received over the first connection segment of the connector body; and a second press sleeve adapted to be received over the second connection segment of the connector body;

wherein the first and second press sleeves each include a distal end and a proximal end, when the first and second press sleeves are attached to the connector body, the respective channels of the connector body receives a lip of the proximal ends of the first and second press sleeves to form a snap fit connection therewith;

wherein the circumferential rib is configured to engage an outer surface of the first and second press sleeves to facilitate a secure connection with the connector body;

wherein the circumferential rib is configured to facilitate location of a pressing tool in relation to the first and second press sleeves to ensure proper alignment of the pressing tool; and wherein the circumferential rib includes a stem portion and a crossbar portion that together form a T-shaped rib that extends along opposing sides of the connector body.

2. The press fitting according to claim 1, wherein the first and second connection segments each include nipple portions, wherein the nipple portions include barbed portions having a plurality of ribs to facilitate coupling the connector body to respective conduits.

3. The press fitting of claim 1, wherein the crossbar portion extends longitudinally parallel to the connector body and extends perpendicularly to the stem portion.

4. The press fitting of claim 1, wherein the crossbar portion of the circumferential rib carries a contact or engagement component that serves as an alignment feature for a pressing or crimping tool.

5. The press fitting of claim 1, wherein the circumferential walls each include a sloped surface that inclines in a direction from a respective first engagement surface toward a second engagement surface of the circumferential walls.

6. The press fitting of claim 5, wherein, when the first and second press sleeves are assembled to the connector body, the curved edge of the lip engages the sloped surface of the circumferential walls for guiding the first and second press sleeves over the circumferential walls into the respective channels of the connector body to form a snap fit connection therewith.

7. The press fitting of claim 5, wherein, when the first and second press sleeves are connected to the connector body, the first and second press sleeves and the respective first and second connection segments together define passageways for receipt of respective first and second conduits; wherein the chamfered edges of the first and second press sleeves allow for ease of insertion of the first and second conduits into the passageways.

8. The press fitting of claim 7, wherein the first and second sleeves each define holes for viewing therethrough to see the position of the first and second conduits during insertion.

9. The press fitting of claim 1, wherein the distal ends of the first and second press sleeves include a flange with a chamfered edge and the proximal ends of the first and second press sleeves include a lip with a curved edge.

10. The press fitting of claim 1, wherein the connector body is formed from a clear polymeric material.

11. The press fitting of claim 1, wherein the first and second press sleeves each include a sleeve body having a locator rib integrally formed therewith to facilitate location of a pressing tool.

12. The press fitting of claim 11, wherein the locator rib of the respective first and second press sleeves include a cross-sectional L-shaped portion formed at an end of the respective first and second press sleeves.

13. A press fitting comprising:

a connector body having a connection segment and a retainer segment, the connection segment including a plurality of barbs, the retainer segment having a pair of circumferential walls defining a channel therebetween; and a press sleeve adapted to be received over the connection segment of the connector body and adapted to be coupled to the retainer segment;

wherein the press sleeve includes a distal end and a proximal end, and when the press sleeve is attached to the connector body, the channel of the connector body receives a lip of the proximal end of the press sleeve to form a snap fit connection therewith;

wherein the press sleeve further includes a sleeve body, a flange forming the distal end of the press sleeve, and a locator rib formed integrally with the sleeve body between the proximal end and the distal end of the press sleeve; and wherein the locator rib and the flange define a crimp region axially therebetween to facilitate location of a pressing tool in relation to the press sleeve to ensure proper alignment of the pressing tool relative to the plurality of barbs on the connection segment of the connector body.

14. The press fitting of claim 13, wherein the locator rib includes overlapping first and second rib portions that extend outwardly away from the sleeve body to form a radius that is larger than a radius of the sleeve body.

15. The press fitting of claim 14, wherein a contact area is provided between the overlapping first and second rib portions, and wherein the contact area extends along an entire radial extent of the overlapping first and second rib portions.

16. The press fitting of claim 14, wherein a gap is provided between the overlapping first and second rib portions, and wherein the gap extends annularly around a longitudinal axis of the connector body.

17. The press fitting of claim 13, wherein the flange at the distal end of the press sleeve has a radius that is larger than the radius of the sleeve body but smaller than a radius of the locator rib.

18. A method of forming a press fitting, the method comprising:

forming a flat disk made from metallic material;

deep-drawing the flat disk into a mold to form a cup-shaped sleeve preform including a bottom wall and a side wall;

forming a locator rib into the side wall of the cup-shaped sleeve preform;

forming an aperture into the bottom wall of the cup-shaped sleeve preform; and forming a flange into a distal end of the side wall of the cup-shaped sleeve preform.

19. A method for assembling a fitting, the method comprising:

selecting a conduit to be used in forming the press sleeve;

forming a locator rib in the conduit such that the locator rib is positioned correctly when the press sleeve is fully formed;

forming a lip at a proximal end of the press sleeve, wherein a portion of the conduit is deformed inwardly to form the lip;

cutting the conduit to a desired part length;

forming a flared flange at the distal end of the press sleeve, wherein the flared flange is formed using a flaring mandrel that engages and expands the distal end of the press sleeve; and performing finishing operations on the press sleeve, wherein the finishing operations include deburring and polishing.

20. A press fitting comprising:

a connector body having a first end, and an opposite, second end, the connector body including a first connection segment at the first end and a second connection segment at the second end, the connector body includes surface portions on outer surfaces of the first and second connection segments, the connector body further includes a circumferential rib centrally positioned between the first and second connection segments, and circumferential walls radially projecting from the connector body on opposing sides of the circumferential rib, wherein the circumferential walls and the circumferential rib together define respective channels in the connector body, the circumferential rib and the circumferential walls being integrally formed with the connector body;

a first press sleeve adapted to be received over the first connection segment of the connector body; and a second press sleeve adapted to be received over the second connection segment of the connector body;

wherein the first and second press sleeves each include a distal end and a proximal end, when the first and second press sleeves are attached to the connector body, the respective channels of the connector body receives a lip of the proximal ends of the first and second press sleeves to form a snap fit connection therewith;

wherein the circumferential rib is configured to engage an outer surface of the first and second press sleeves to facilitate a secure connection with the connector body;

wherein the circumferential rib is configured to facilitate location of a pressing tool in relation to the first and second press sleeves to ensure proper alignment of the pressing tool; and wherein the first and second press sleeves each include a sleeve body having a locator rib integrally formed therewith to facilitate location of a pressing tool.

* * * * *